US012327947B2

(12) United States Patent
Avery et al.

(10) Patent No.: US 12,327,947 B2
(45) Date of Patent: Jun. 10, 2025

(54) HIGH DENSITY RECEPTACLE

(71) Applicant: Molex, LLC, Lisle, IL (US)

(72) Inventors: Hazelton Avery, Batavia, IL (US); Kent E. Regnier, Lombard, IL (US)

(73) Assignee: Molex, LLC, Lisle, IL (US)

( * ) Notice: Subject to any disclaimer, the term of this patent is extended or adjusted under 35 U.S.C. 154(b) by 552 days.

(21) Appl. No.: 17/722,396

(22) Filed: Apr. 18, 2022

(65) Prior Publication Data

US 2022/0247114 A1 Aug. 4, 2022

Related U.S. Application Data

(63) Continuation of application No. 16/302,225, filed as application No. PCT/US2017/032866 on May 16, 2017, now Pat. No. 11,309,655.

(60) Provisional application No. 62/337,064, filed on May 16, 2016.

(51) Int. Cl.

| | |
|---|---|
| ***H01R 13/514*** | (2006.01) |
| ***H01R 12/72*** | (2011.01) |
| ***H01R 13/6471*** | (2011.01) |
| ***H01R 13/6587*** | (2011.01) |

(52) U.S. Cl.
CPC ......... *H01R 13/514* (2013.01); *H01R 12/721* (2013.01); *H01R 13/6471* (2013.01); *H01R 13/6587* (2013.01)

(58) Field of Classification Search
CPC .. H01R 13/502; H01R 13/514; H01R 13/648; H01R 13/6587; H01R 12/721; H01R 13/6471
See application file for complete search history.

(56) References Cited

U.S. PATENT DOCUMENTS

| | | | |
|---|---|---|---|
| 4,298,237 | A | 11/1981 | Griffith et al. |
| 4,548,452 | A | 10/1985 | Gillett |
| 4,560,221 | A | 12/1985 | Olsson |
| 4,598,966 | A | 7/1986 | Boland |
| 4,806,103 | A | 2/1989 | Kniese et al. |
| 5,024,609 | A | 6/1991 | Piorunneck |
| 5,051,099 | A | 9/1991 | Pickles et al. |
| 5,110,309 | A | 5/1992 | Ichitsubo |
| 5,239,748 | A | 8/1993 | Hamilton |

(Continued)

FOREIGN PATENT DOCUMENTS

| | | | |
|---|---|---|---|
| CN | 101964470 | A | 2/2011 |
| CN | 102176586 | A | 9/2011 |

(Continued)

OTHER PUBLICATIONS

First office action received for Chinese Application No. 201780042538.0 mailed on Nov. 5, 2019, 14 pages (6 pages of English translation and 8 pages of official notification).

(Continued)

*Primary Examiner* — Edwin A. Leon

(57) ABSTRACT

A receptacle is depicted. The receptacle can provide two rows of terminals to increase the density of the interface. If desired, a connector positioned in the receptacle can omit the use of a housing, even if the receptacle provides a stacked connector configuration. With the use of various airflow features it is possible to cool inserted plug modules that use more than 6 watts and potentially more than 8 watts of power.

14 Claims, 29 Drawing Sheets

(56) References Cited

U.S. PATENT DOCUMENTS

| | | | |
|---|---|---|---|
| 5,425,651 | A | 6/1995 | Thrush et al. |
| 5,986,880 | A | 11/1999 | Santeler et al. |
| 6,074,228 | A | 6/2000 | Berg et al. |
| 6,203,328 | B1 | 3/2001 | Ortega et al. |
| 6,645,009 | B1 | 11/2003 | Billman et al. |
| 7,128,596 | B2 | 10/2006 | Masaki et al. |
| 7,204,717 | B2 | 4/2007 | Chang et al. |
| 7,309,239 | B2 | 12/2007 | Shuey et al. |
| 7,453,338 | B2 | 11/2008 | Aronson |
| 7,798,820 | B2 | 9/2010 | Hong |
| 7,845,975 | B2 | 12/2010 | Cheng et al. |
| 7,905,729 | B2 | 3/2011 | Goosens et al. |
| 7,963,799 | B1 | 6/2011 | Lee et al. |
| 8,292,669 | B2 | 10/2012 | Wang et al. |
| 8,353,707 | B2 | 1/2013 | Wang et al. |
| 8,353,728 | B2 | 1/2013 | Wang et al. |
| 8,506,333 | B2 | 8/2013 | Wang et al. |
| 8,545,240 | B2 | 10/2013 | Casher et al. |
| 8,614,398 | B2 | 12/2013 | Regnier et al. |
| 8,690,608 | B2 | 4/2014 | Naito et al. |
| 8,696,389 | B2 | 4/2014 | Mason et al. |
| 8,727,793 | B2 | 5/2014 | Cafiero et al. |
| 8,845,351 | B2 | 9/2014 | Johnson et al. |
| 8,858,237 | B2 | 10/2014 | Hsu et al. |
| 8,944,830 | B2 | 2/2015 | Little et al. |
| 9,065,225 | B2 | 6/2015 | Degner et al. |
| 9,136,236 | B2 | 9/2015 | Starkston et al. |
| 9,484,673 | B1 | 11/2016 | Yang |
| 9,525,245 | B2 | 12/2016 | Regnier et al. |
| 9,711,911 | B2 | 7/2017 | Regnier et al. |
| 9,748,713 | B2 | 8/2017 | Regnier et al. |
| 9,806,476 | B2 | 10/2017 | Long |
| 11,088,480 | B2 * | 8/2021 | Avery .................. H01R 13/405 |
| 11,309,655 | B2 * | 4/2022 | Avery .................. H01R 13/514 |
| 11,509,100 | B2 * | 11/2022 | Chen .................. H01R 13/6586 |
| 2003/0203676 | A1 | 10/2003 | Hasircoglu |
| 2004/0072467 | A1 | 4/2004 | Jordan et al. |
| 2005/0009402 | A1 | 1/2005 | Chien et al. |
| 2005/0032429 | A1 | 2/2005 | Hull et al. |
| 2007/0072457 | A1 | 3/2007 | Hamazaki |
| 2010/0178804 | A1 | 7/2010 | Long |
| 2011/0223805 | A1 | 9/2011 | Regnier et al. |
| 2012/0099275 | A1 | 4/2012 | Regnier |
| 2012/0156938 | A1 | 6/2012 | Zhang |
| 2013/0115815 | A1 | 5/2013 | Lim et al. |
| 2013/0189856 | A1 | 7/2013 | Ko et al. |
| 2013/0196553 | A1 | 8/2013 | Gailus |
| 2013/0344745 | A1 | 12/2013 | Nichols |
| 2014/0071646 | A1 | 3/2014 | Qian et al. |
| 2014/0227898 | A1 | 8/2014 | Zhang |

FOREIGN PATENT DOCUMENTS

| | | | |
|---|---|---|---|
| CN | 102197540 | A | 9/2011 |
| CN | 203242846 | U | 10/2013 |
| CN | 103858284 | A | 6/2014 |
| CN | 105207012 | A | 12/2015 |
| CN | 105390848 | A | 3/2016 |
| JP | H05242937 | A | 9/1993 |
| JP | 2007501502 | A | 1/2007 |
| JP | 2008515167 | A | 5/2008 |
| JP | 2008293950 | A | 12/2008 |
| JP | 2010267503 | A | 11/2010 |
| JP | 2011029174 | A | 2/2011 |
| JP | 2012502436 | A | 1/2012 |
| JP | 2012502438 | A | 1/2012 |
| JP | 2013524479 | A | 6/2013 |
| JP | 2014522091 | A | 8/2014 |
| JP | 2015525427 | A | 9/2015 |
| JP | 2016508666 | A | 3/2016 |
| TW | 201338276 | A | 9/2013 |
| TW | 201401667 | A | 1/2014 |
| TW | 201515332 | A | 4/2015 |
| TW | 201539868 | A | 10/2015 |
| WO | 2008012428 | A2 | 1/2008 |
| WO | 2012027679 | A2 | 3/2012 |
| WO | 2013022889 | A2 | 2/2013 |
| WO | 2013166380 | A1 | 11/2013 |
| WO | 2015021221 | A1 | 2/2015 |
| WO | 2015148786 | A1 | 10/2015 |
| WO | 2017201024 | A1 | 11/2017 |

OTHER PUBLICATIONS

Fourth office action received for Chinese Application No. 201780042538.0 mailed on Nov. 24, 2021, 2021, 10 pages (6 pages of English translation and 4 pages of official notification).

International Preliminary Report on Patentability received for PCT Application No. PCT/US2017/032866, mailed on Nov. 29, 2018, 7 pages.

International Search Report and Written Opinion received for PCT Application No. PCT/US2017/032866, mailed on Jul. 26, 2017, 11 pages.

Office Action received for JP Application No. 2018-560609, mailed on Jan. 7, 2020, 11 pages (6 pages of English translation and 5 pages of official notification).

Office Action received for JP Application No. 2018-560609, mailed on Sep. 8, 2020, 8 pages (4 pages of English translation and 4 pages of official notification).

Office Action received for JP Application No. 2018-560609, mailed on Sep. 21, 2021, 7 pages (4 pages of English translation and 3 pages of official notification).

Office Action received for JP Application No. 2020-187070, mailed on Dec. 10, 2021, 16 pages (8 pages of English translation and 8 pages of official notification).

Office Action received for JP Application No. 2020-187070, mailed on Feb. 15, 2022, 12 pages (6 pages of English translation and 6 pages of official notification).

Second office action received for Chinese Application No. 201780042538.0 mailed on Sep. 29, 2020, 10 pages (6 pages of English translation and 4 pages of official notification).

Third office action received for Chinese Application No. 201780042538.0 mailed on Jul. 5, 2021, 10 pages (6 pages of English translation and 4 pages of official notification).

* cited by examiner

HIGH DENSITY RECEPTACLE

CROSS-REFERENCES TO RELATED APPLICATIONS

This application is a continuation application of U.S. application Ser. No. 16/302,225 filed on Nov. 16, 2018, which is a national stage of International Application No. PCT/US2017/032866, filed on May 16, 2017 and which claims priority to U.S. Provisional Application No. 62/337,064, filed on May 16, 2016, all of which are incorporated herein by reference in their entirety.

TECHNICAL FIELD

This disclosure relates to the field of input/output (IO) connectors, more specifically to IO connectors suitable for use in high data rate applications.

DESCRIPTION OF RELATED ART

Input/output (IO) connectors are designed to support high data rates and a number of improvements have been developed to help provide data rates that reach 25 Gbps and even higher. In order to support consumer needs and desires, however, many companies are looking at ways to support higher data rates. As a result, development work into supporting 50 Gbps using NRZ encoding and 100 Gbps using PAM 4 encoding are underway. These increases will pose significant problems for existing manufacturing techniques, however, as conventional circuit boards cannot readily support 25 GHz signals. Thus new architectures and methods will be required.

Another method to support increased data rates has been to try to increase the number of ports. One way to increase the number of ports is to shrink the size of the connector. For example, it is common for many standard connectors to be designed to work on a 0.8 mm or 0.75 mm pitch and recently a connector standard that support 0.5 mm has been approved (the OCULINK connector). While shrinking the connector size works well for clean sheet designs and is effect at supporting very high density at the front of rack, smaller connectors are more challenging to use for optical connector designs as the very small size makes it challenging to dissipate sufficient thermal energy. They also tend to use smaller sized conductors, which makes it difficult to support more than 2 or 3 meter length cables. In addition, for people that wish to have some level of backward compatibility, the new smaller connector size poses potential issues. As a result, certain individuals would appreciate further improvements in connector technology.

SUMMARY

A connector is disclosed that includes a set of wafers formed of terminals supported by an insulative frame. The set of wafers can be positioned in a cage without a housing. Card slots members are aligned with contacts of the terminals. In an embodiment a connector can include a wafer that supports two rows of terminals on both sides of a card slot and the connector can be arranged to have a press-fit tails.

BRIEF DESCRIPTION OF THE DRAWINGS

The present disclosure is illustrated by way of example and not limited in the accompanying figures in which like reference numerals indicate similar elements and in which.

DETAILED DESCRIPTION OF THE PREFERRED EMBODIMENTS

Figure 1:
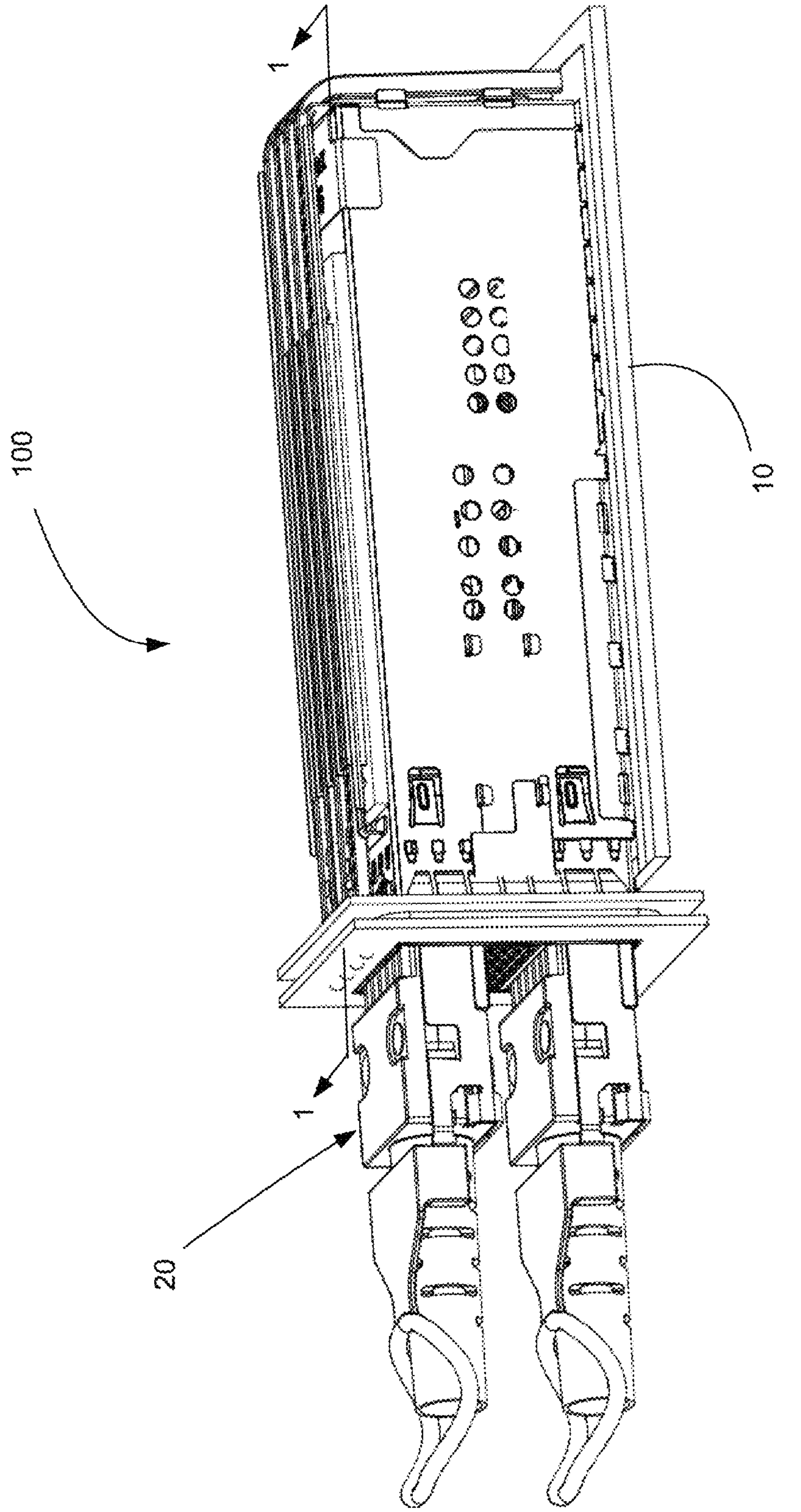
FIG. 1 illustrates a perspective view of an embodiment of connector system.
Figure 2:
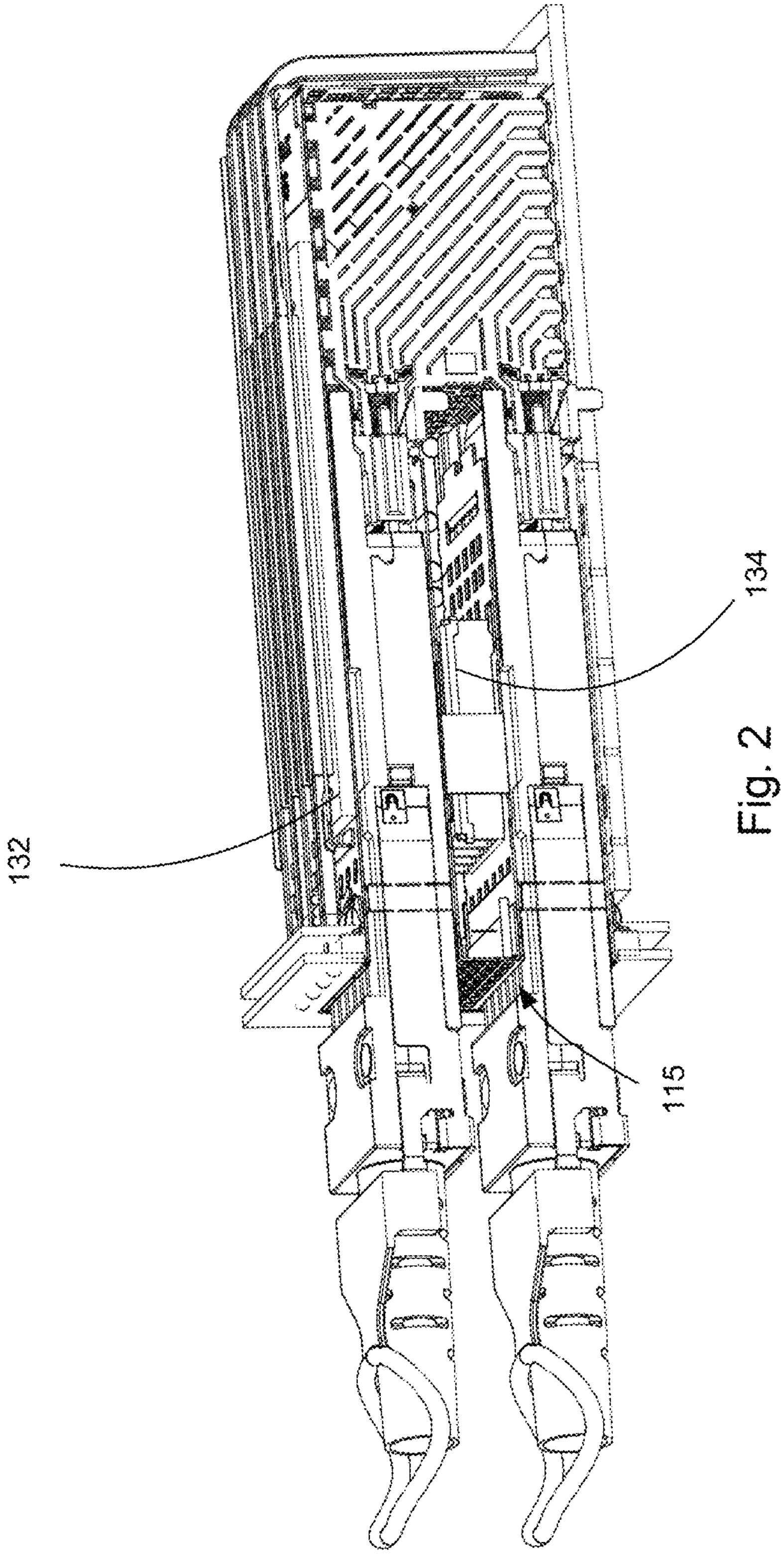
FIG. 2 illustrates a perspective sectional view of the embodiment depicted in FIG. 1, taken along line 1-1.
Figure 3:
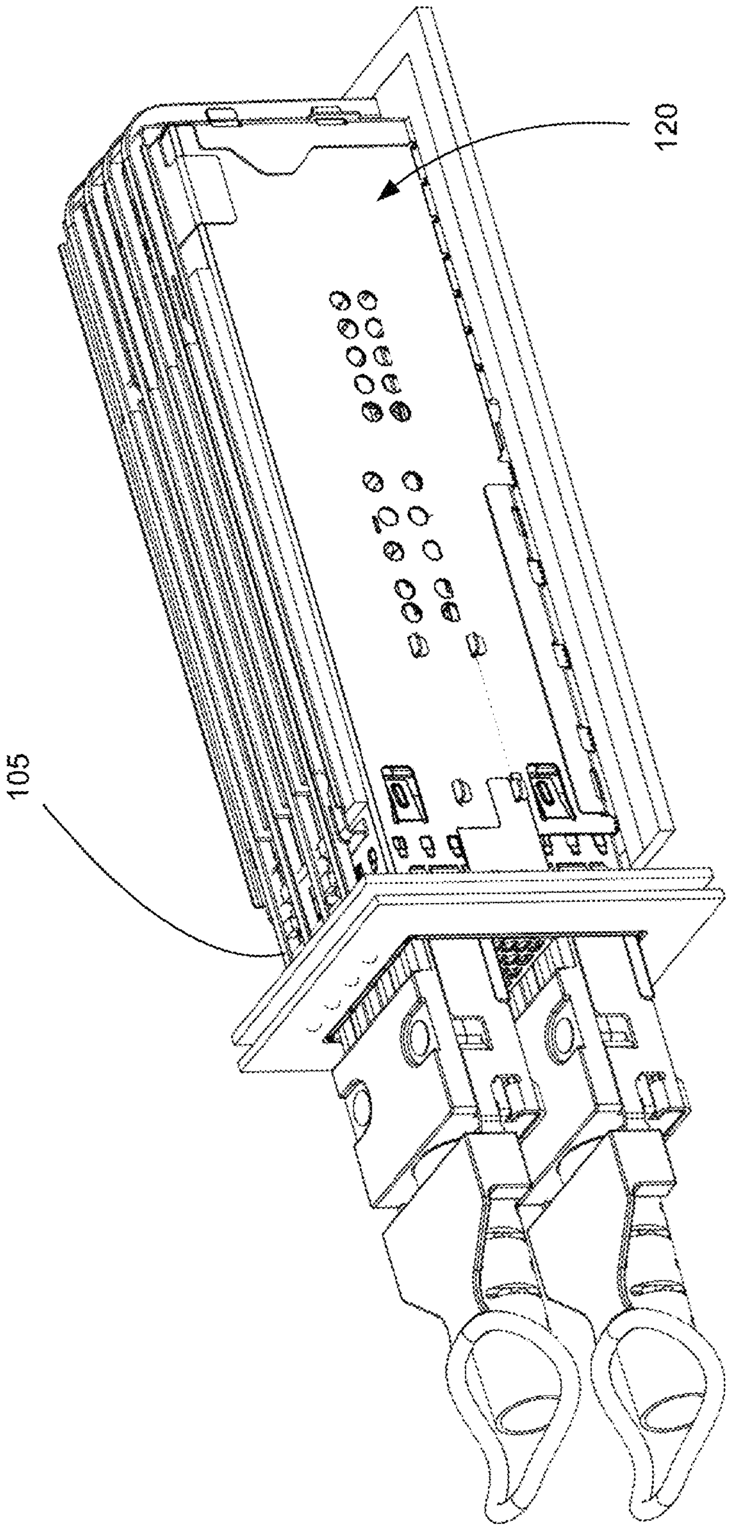
FIG. 3 illustrates another perspective view of the embodiment depicted in FIG. 1.
Figure 4:
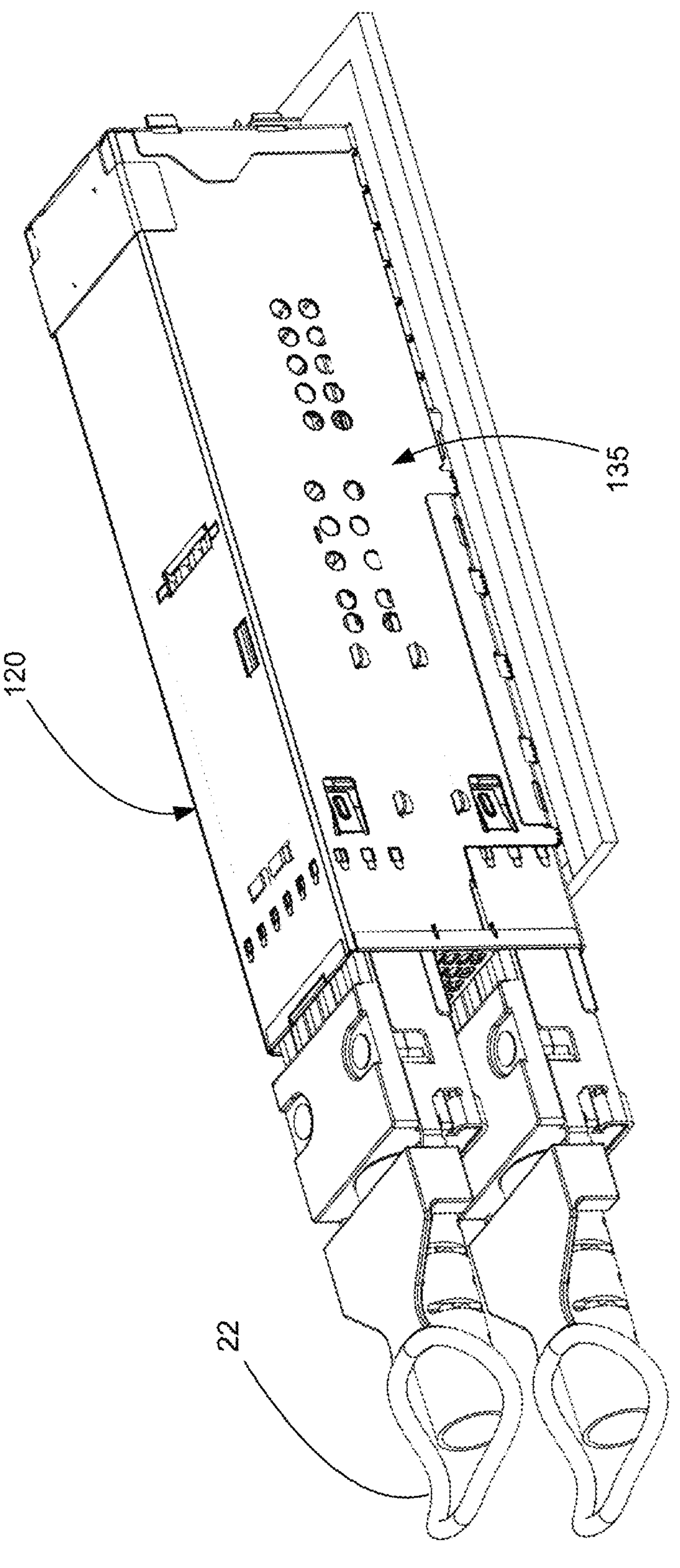
FIG. 4 illustrates a simplified perspective view of the embodiment depicted in FIG. 3.
Figure 5:
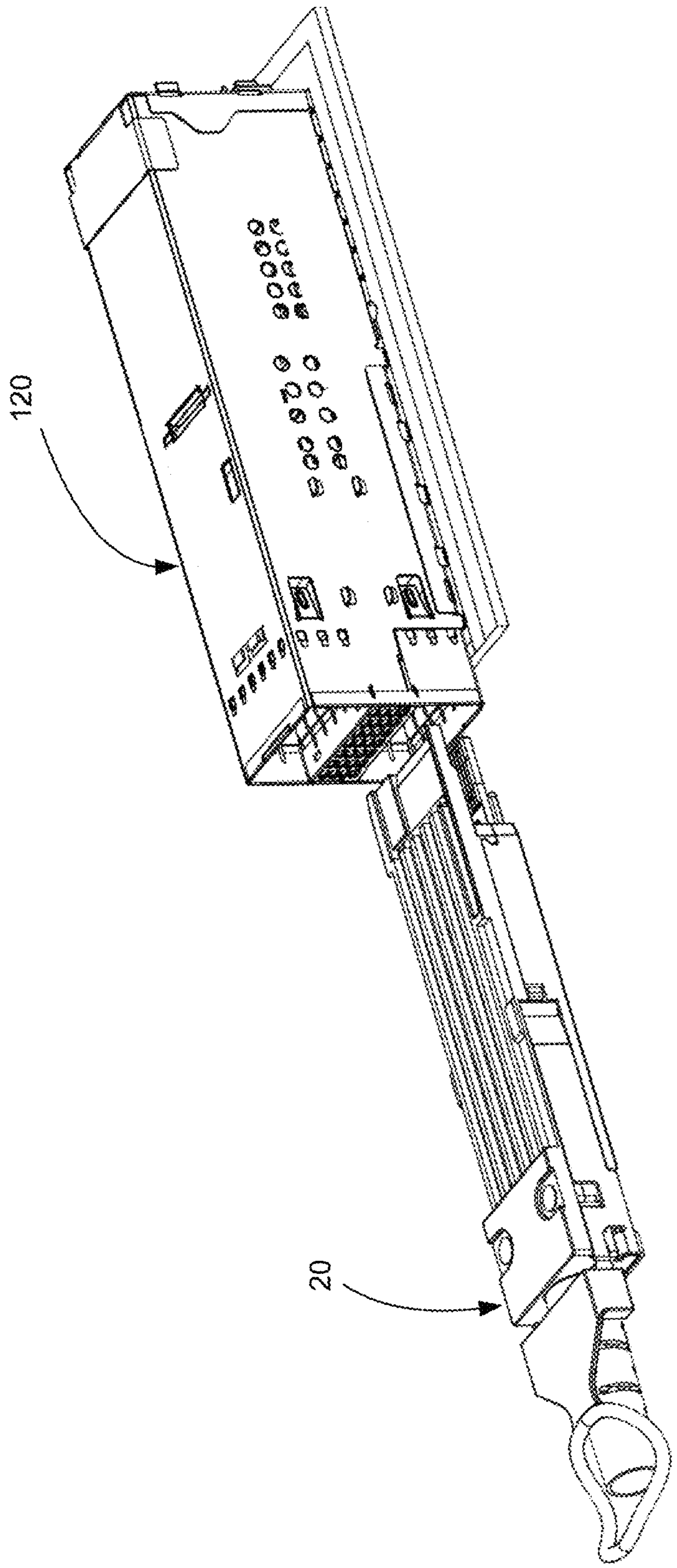
FIG. 5 illustrates a perspective view of an embodiment of a plug module prior to insertion into a receptacle.
Figure 6:
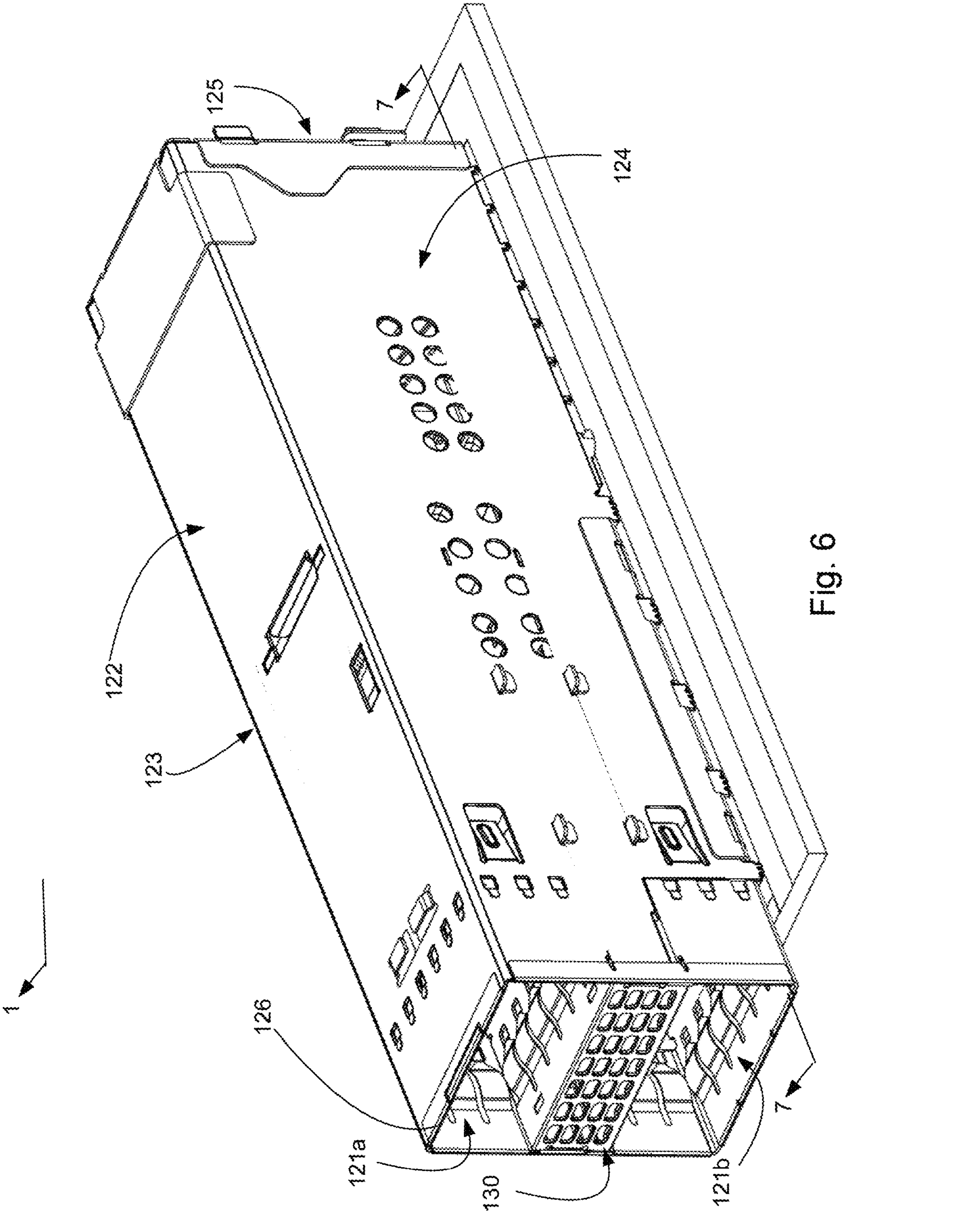
FIG. 6 illustrates a perspective view of an embodiment of a receptacle.
Figure 7A:
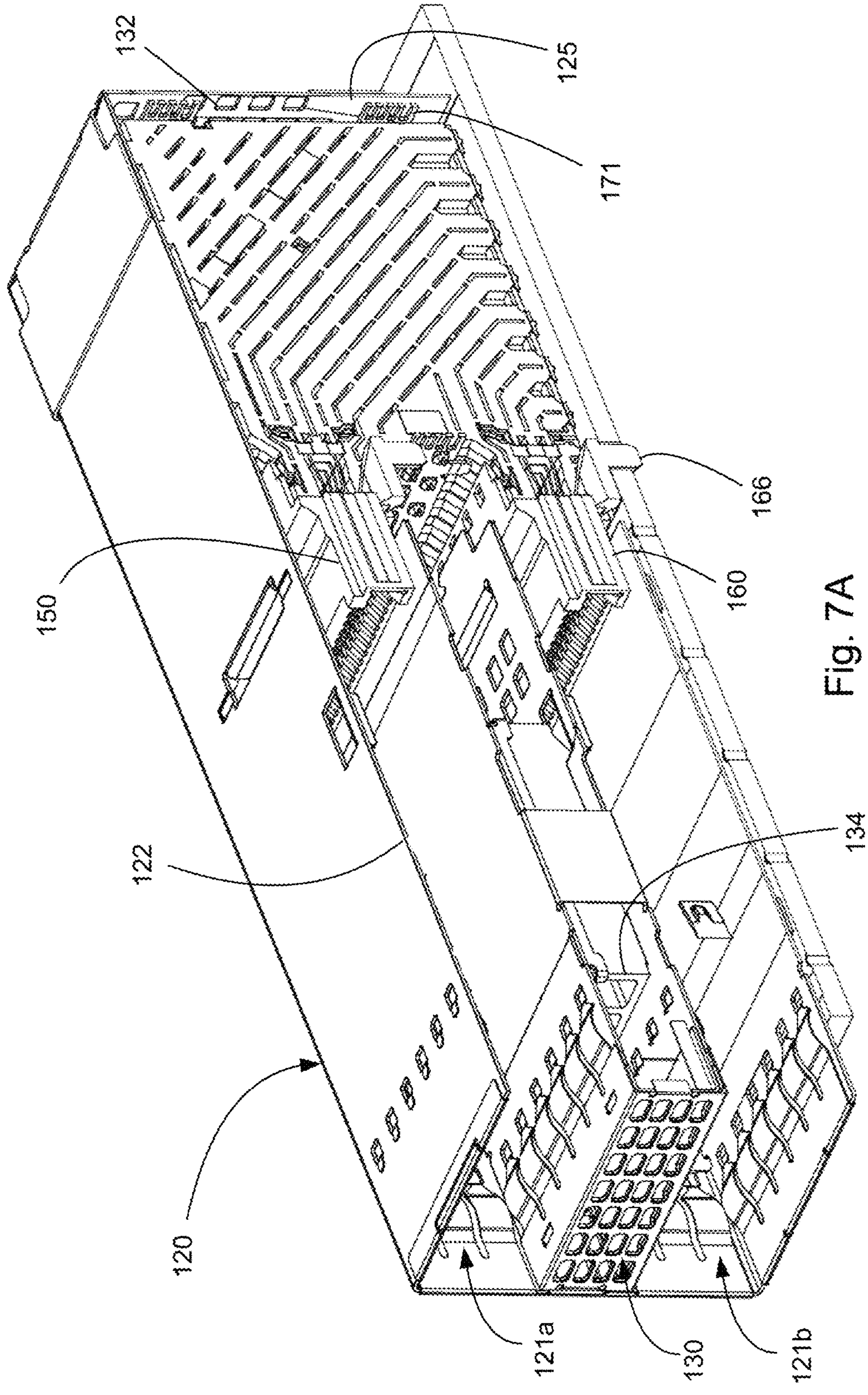
FIG. 7A illustrates a perspective sectional view of the embodiment depicted in FIG. 6, taken along line 7-7.
Figure 7B:
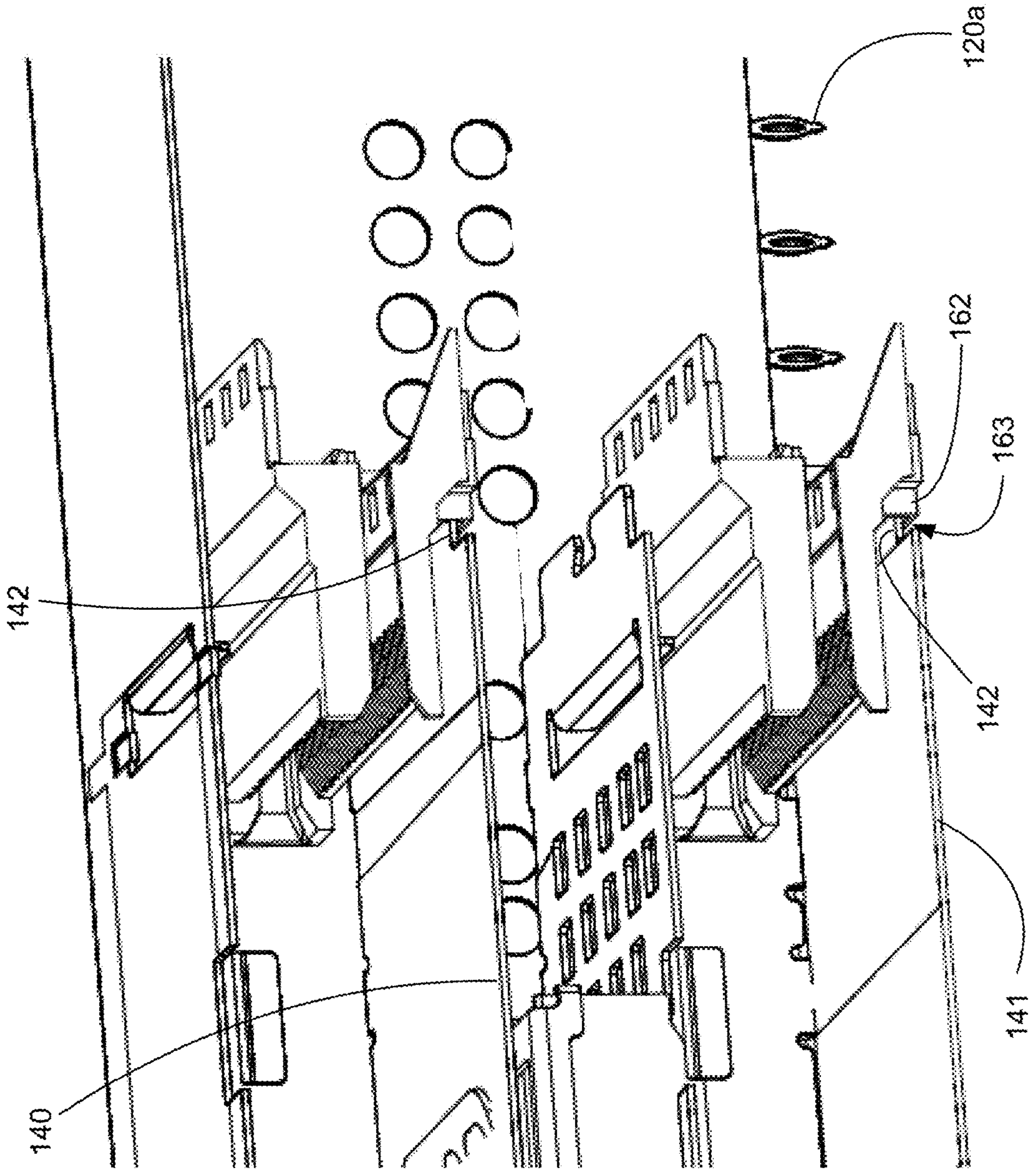
FIG. 7B illustrates an enlarged simplified perspective view of the embodiment depicted in FIG. 7A.
Figure 7C:
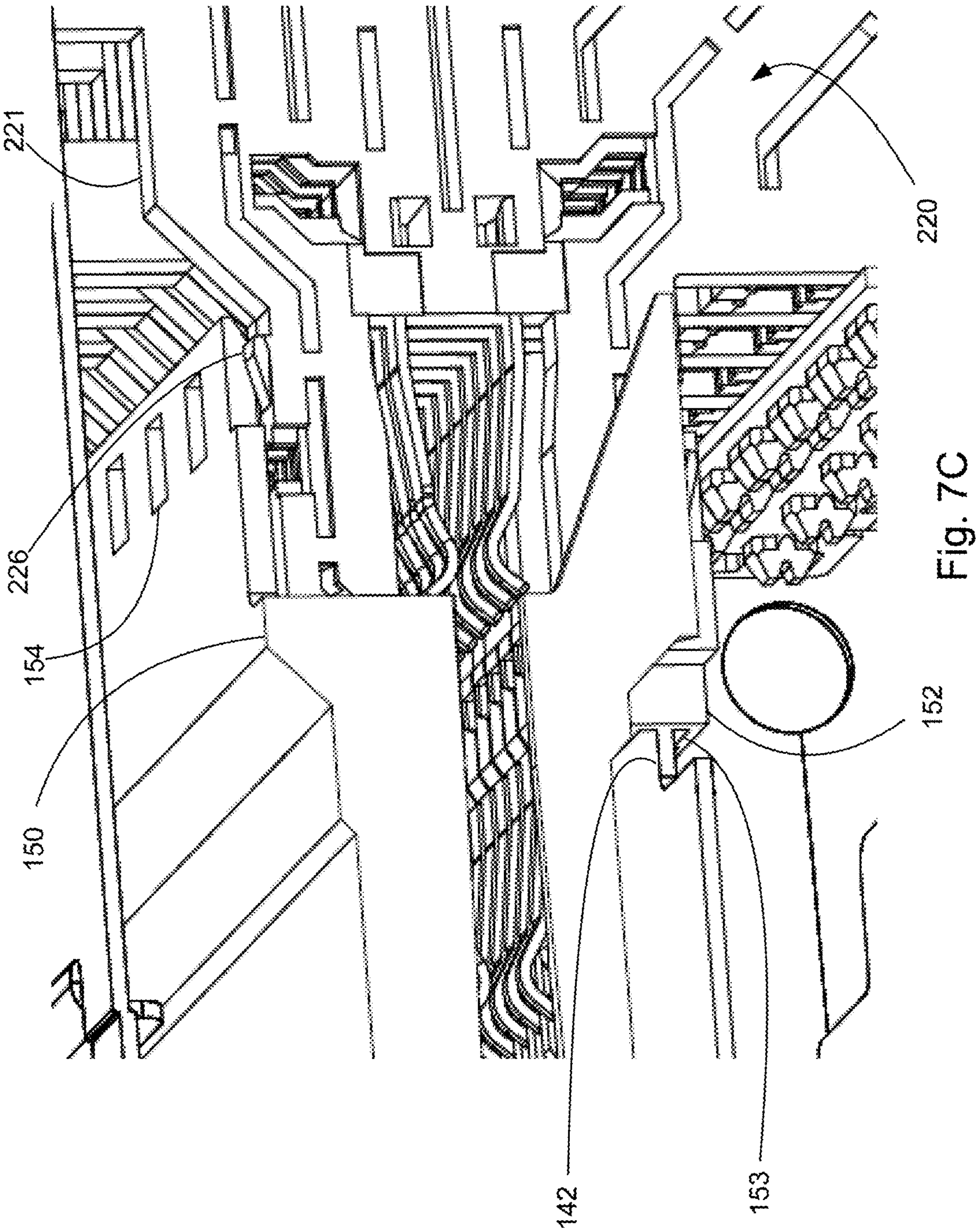
FIG. 7C illustrates a enlarged perspective view of an embodiment depicted in FIG. 7A.
Figure 8:
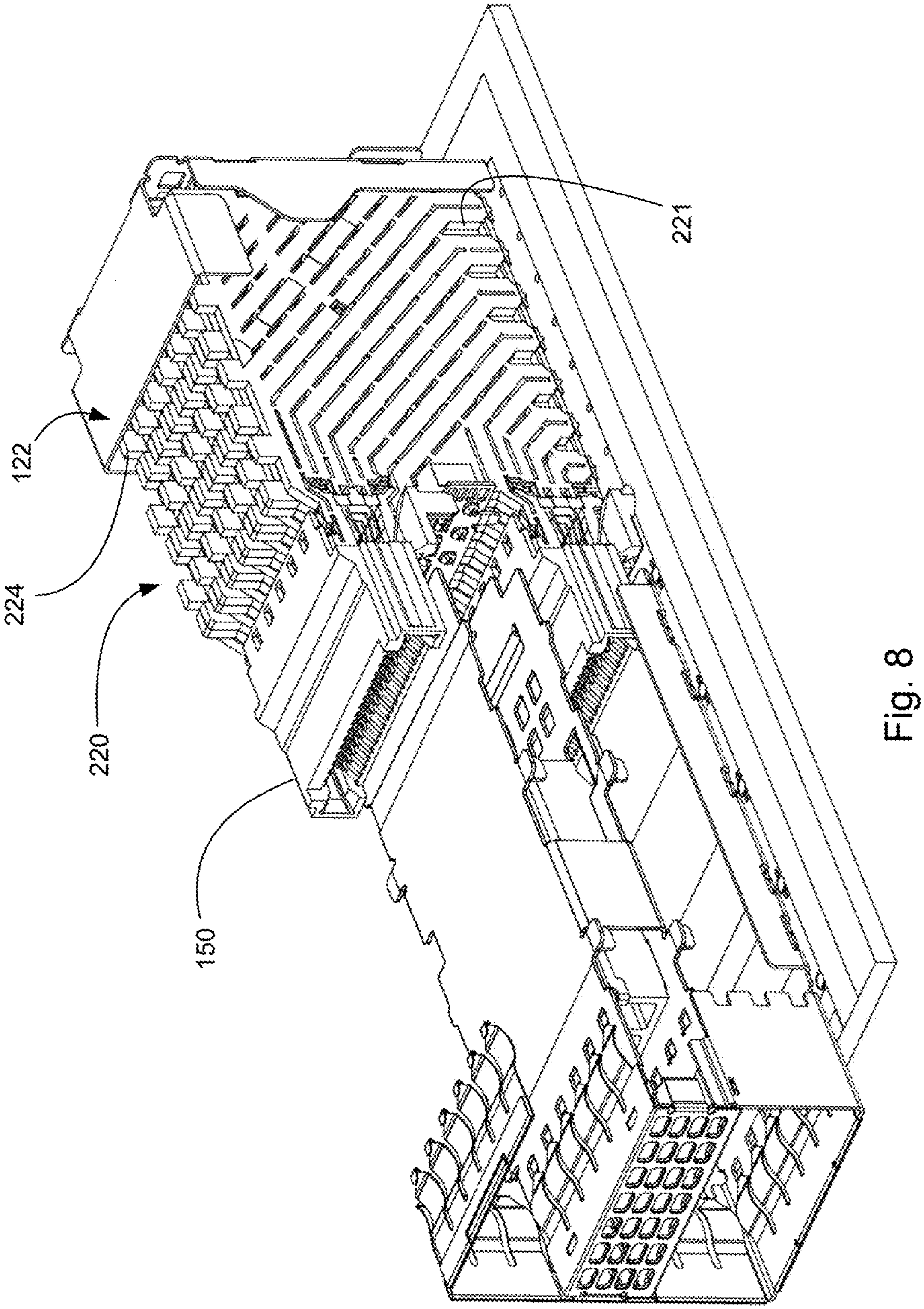
FIG. 8 illustrates a perspective view of the embodiment depicted in FIG. 6 with the cage partially removed.
Figure 9:
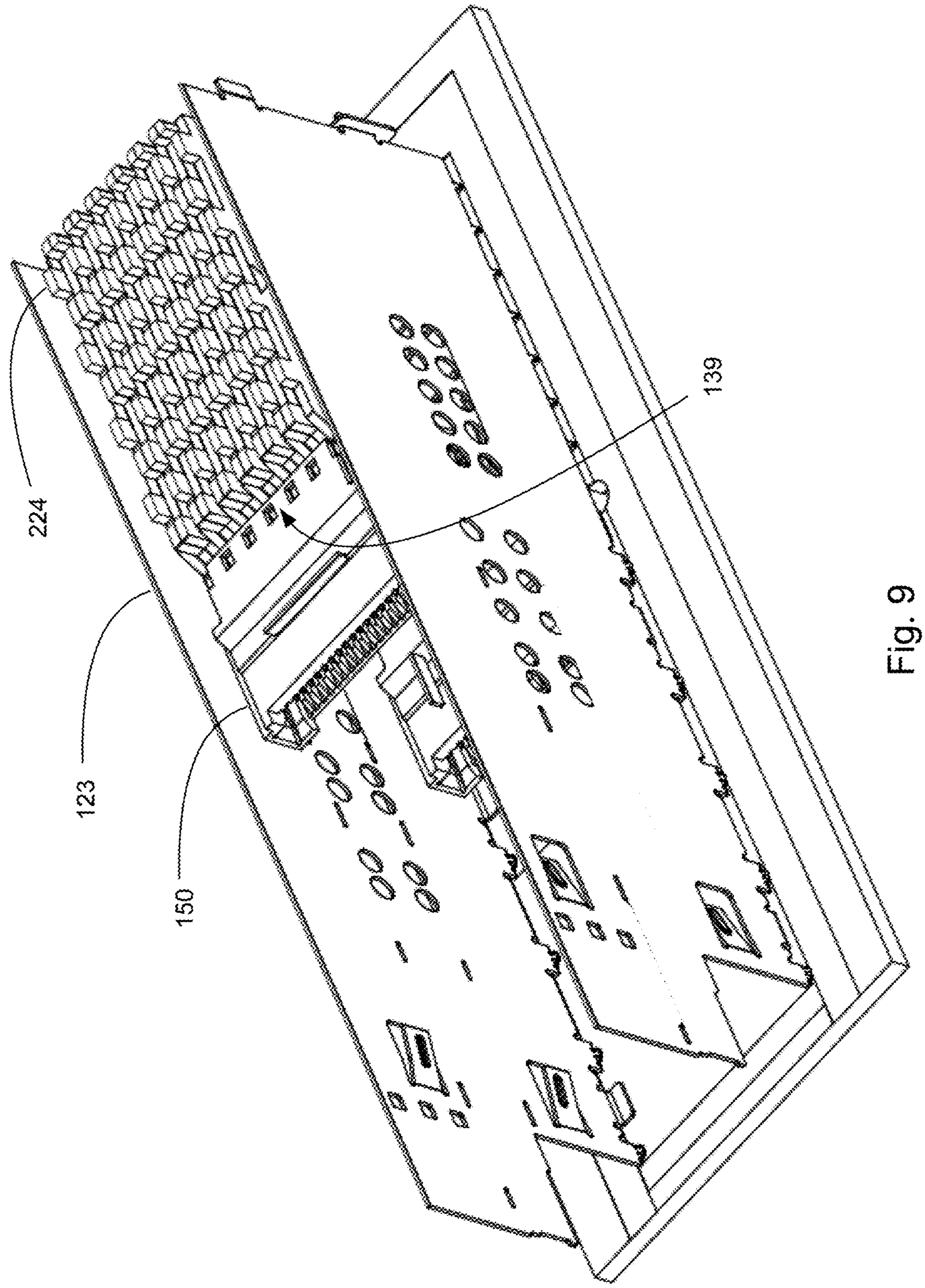
FIG. 9 illustrates a simplified perspective view of the embodiment depicted in FIG. 6 with the top wall and front portion of the cage removed.
Figure 10:
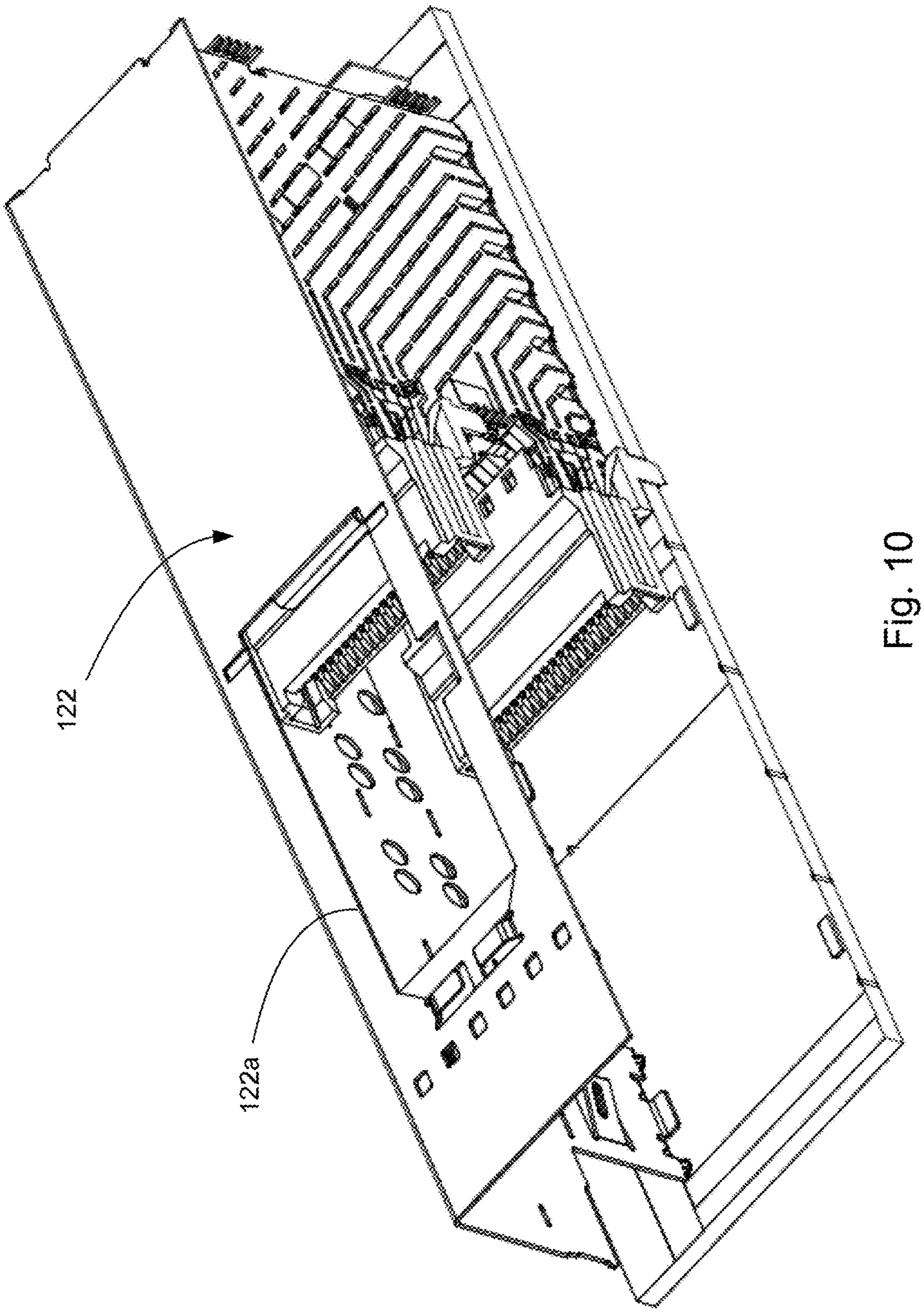
FIG. 10 illustrates a perspective cross-sectional view of the embodiment depicted in FIG. 7 with a modified top wall.
Figure 11A:
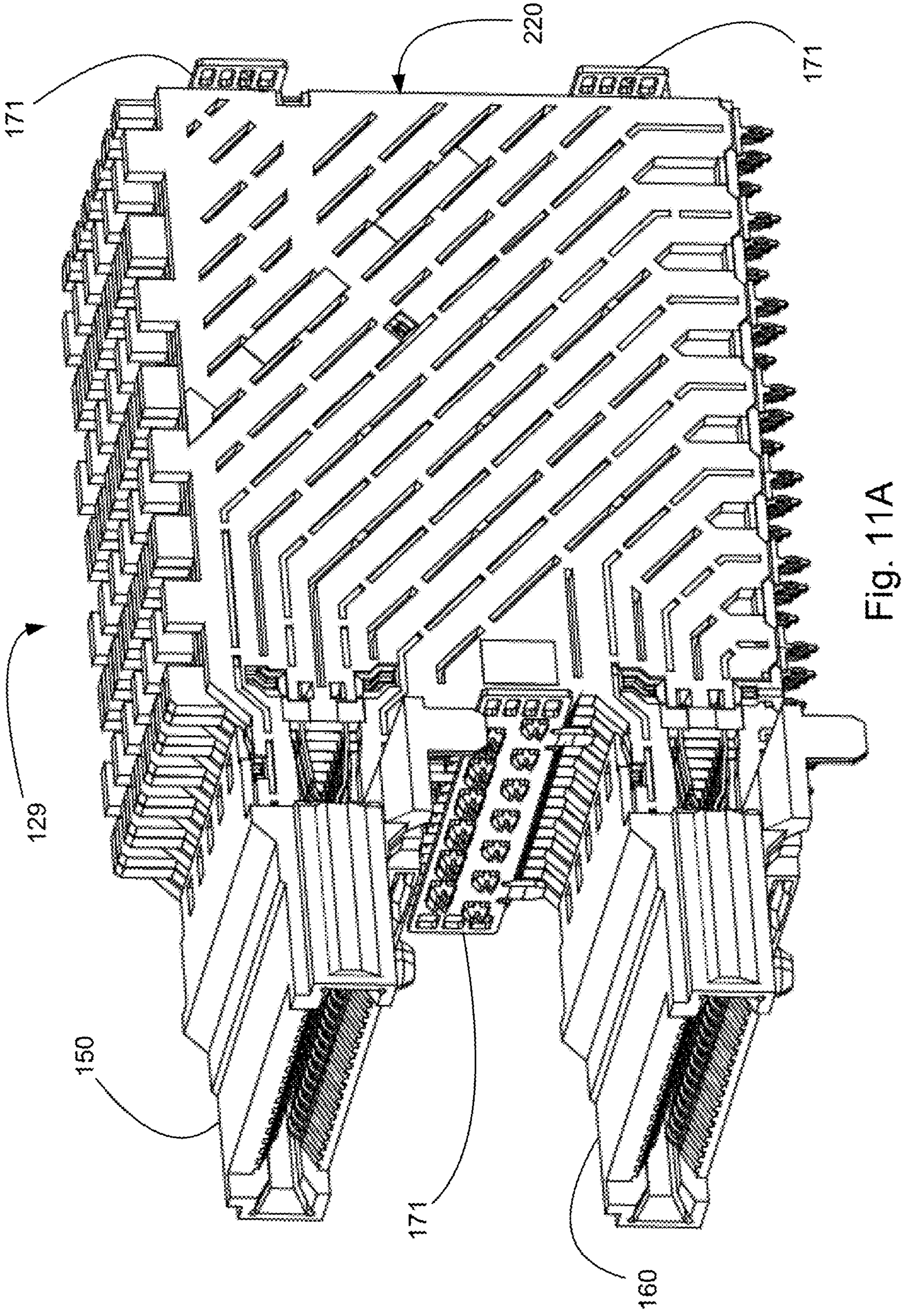
FIG. 11A illustrates a perspective view of an embodiment of a connector.
Figure 11B:
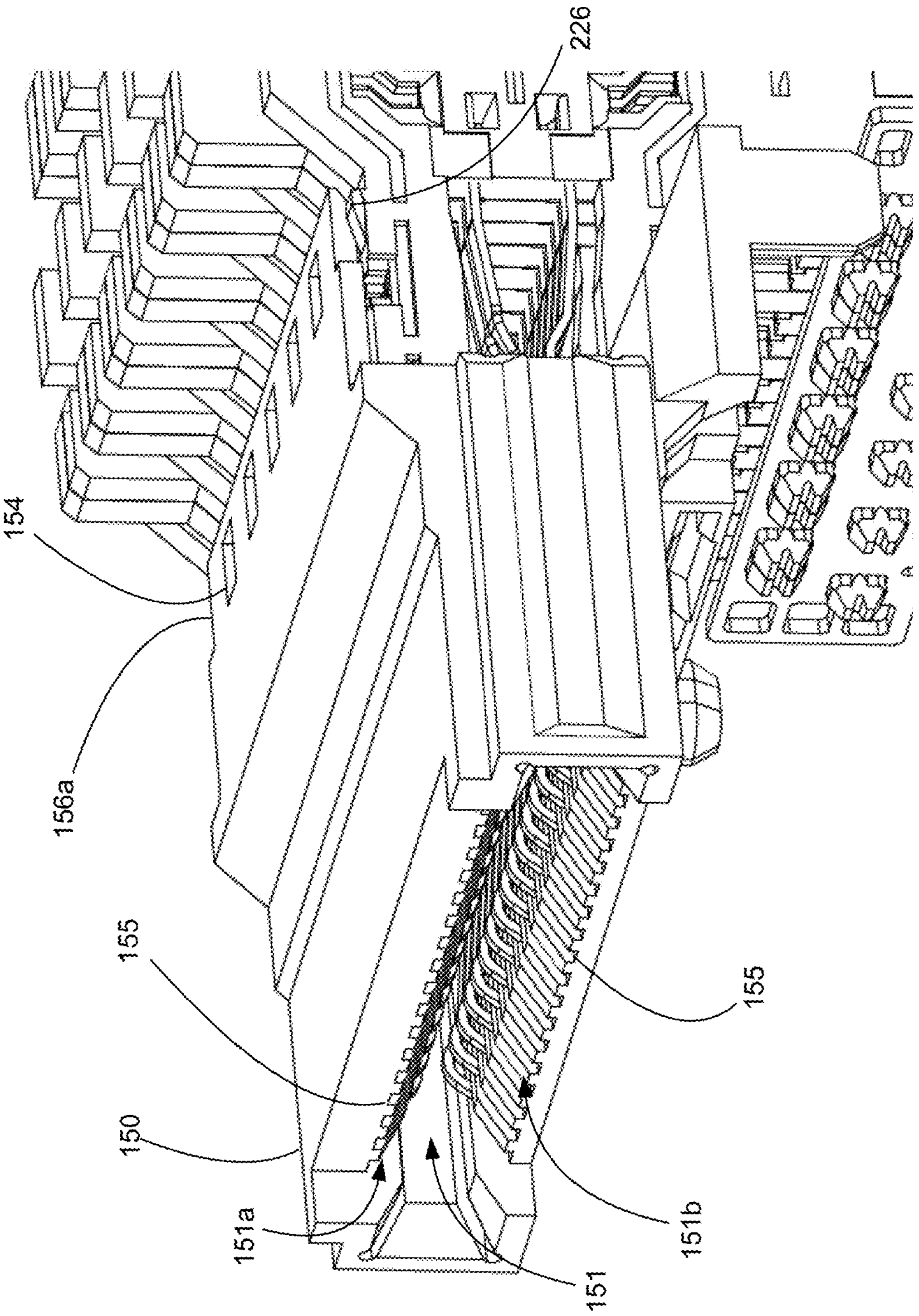
FIG. 11B illustrates an enlarged perspective view of the embodiment depicted in FIG. 11A.
Figure 12:
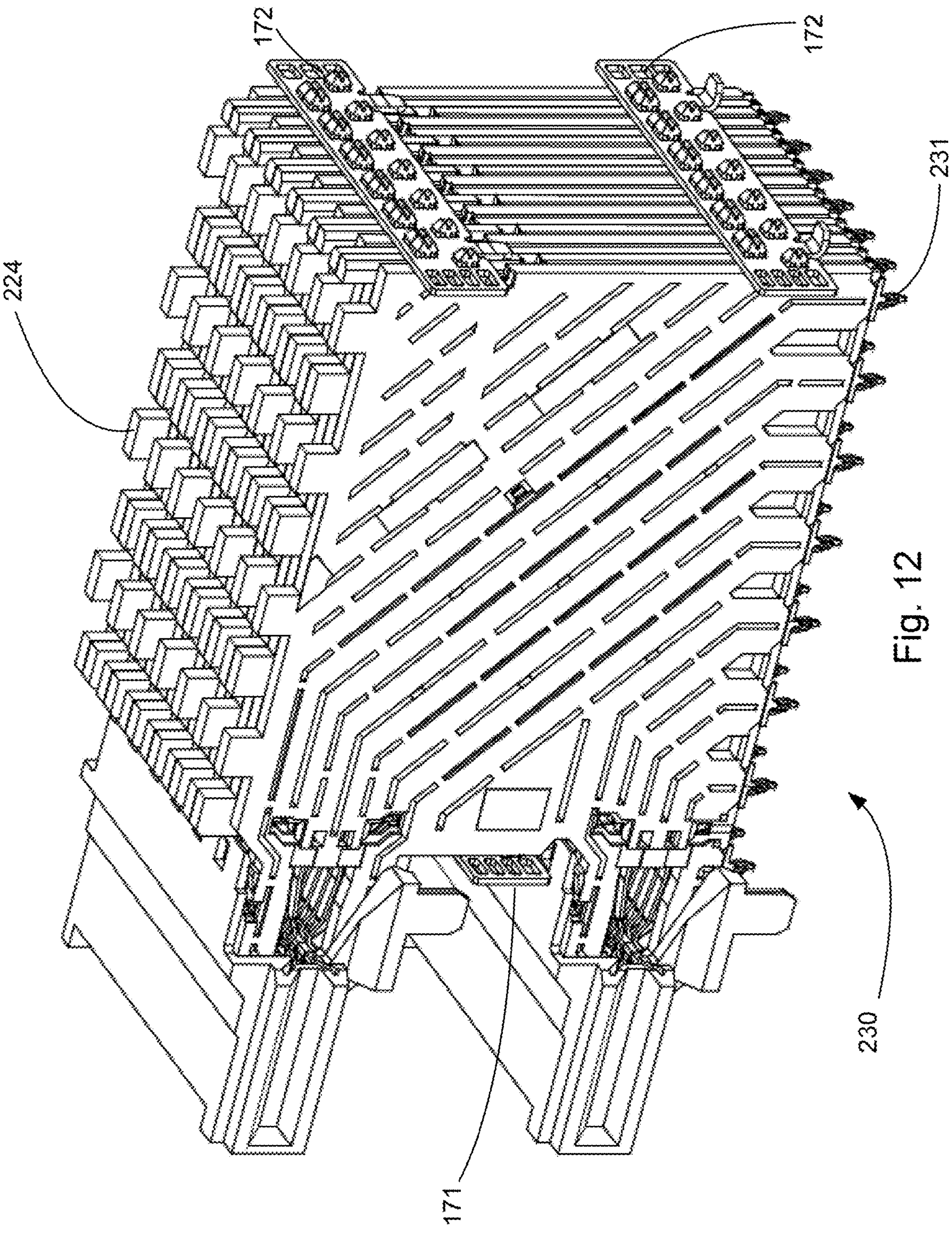
FIG. 12 illustrates another perspective view of the embodiment depicted in FIG. 11A.
Figure 13:
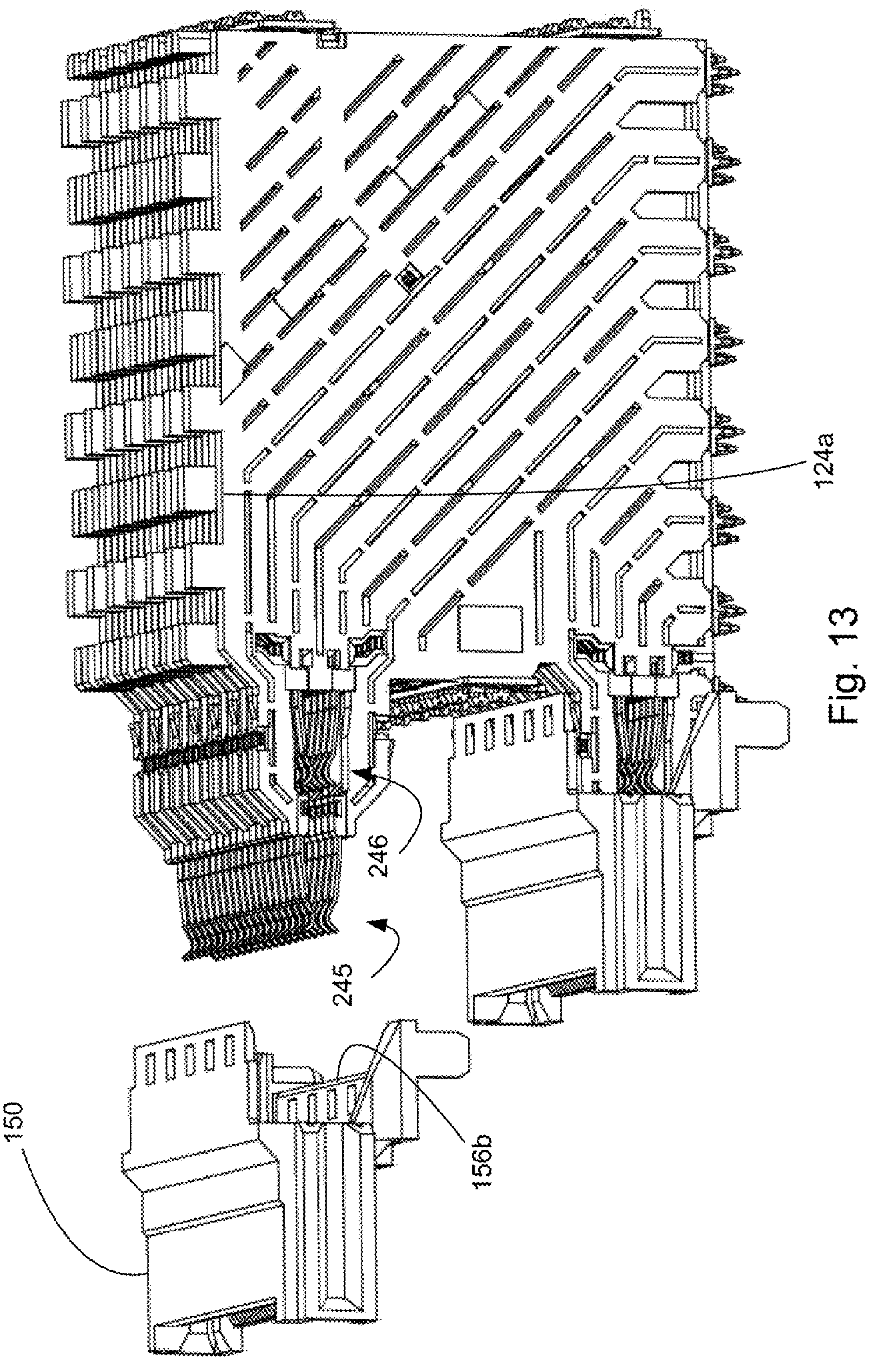
FIG. 13 illustrates a partially exploded perspective view of the embodiment depicted in FIG. 11A.
Figure 14:
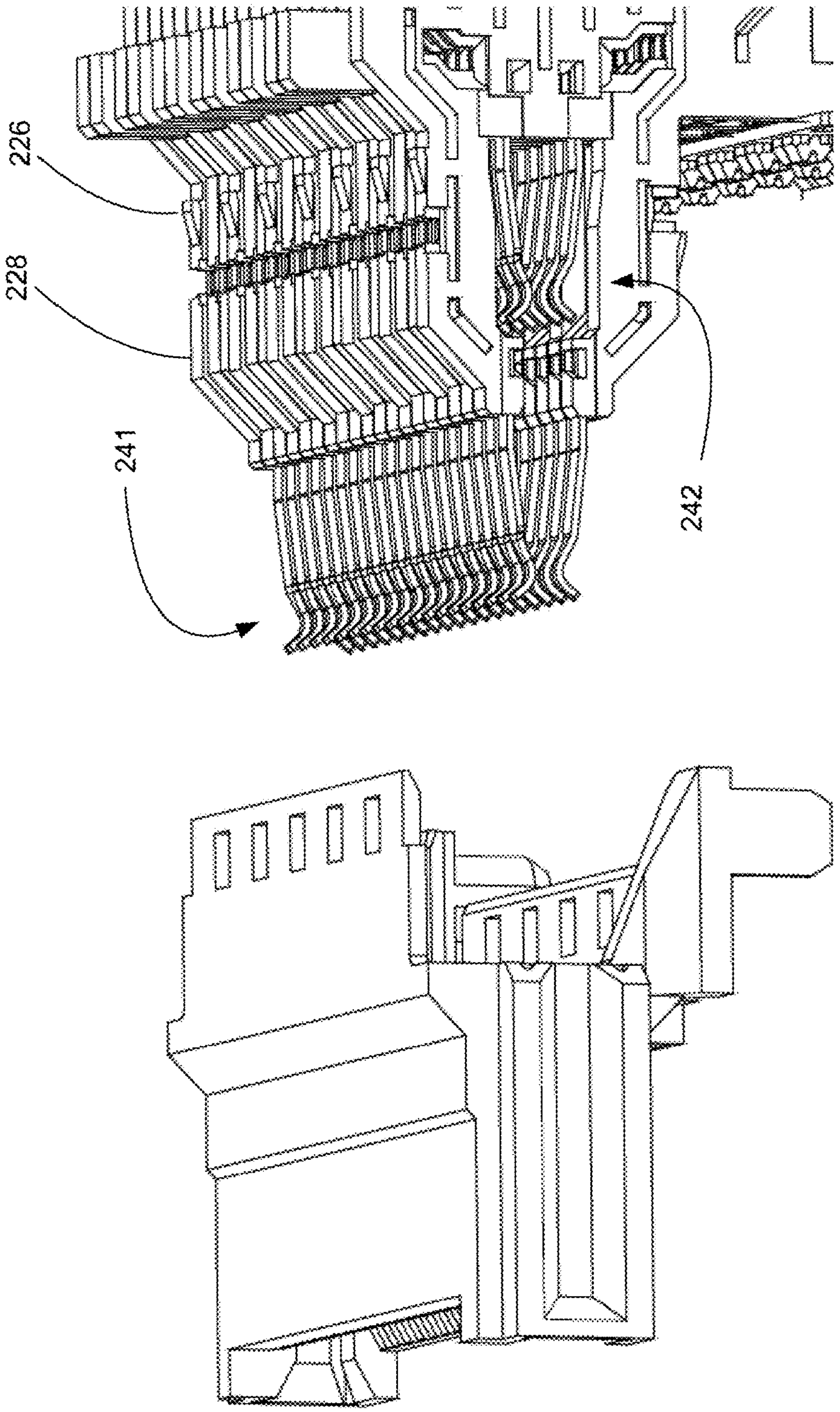
FIG. 14 illustrates an enlarged perspective view of the embodiment depicted in FIG. 13.
Figure 15:
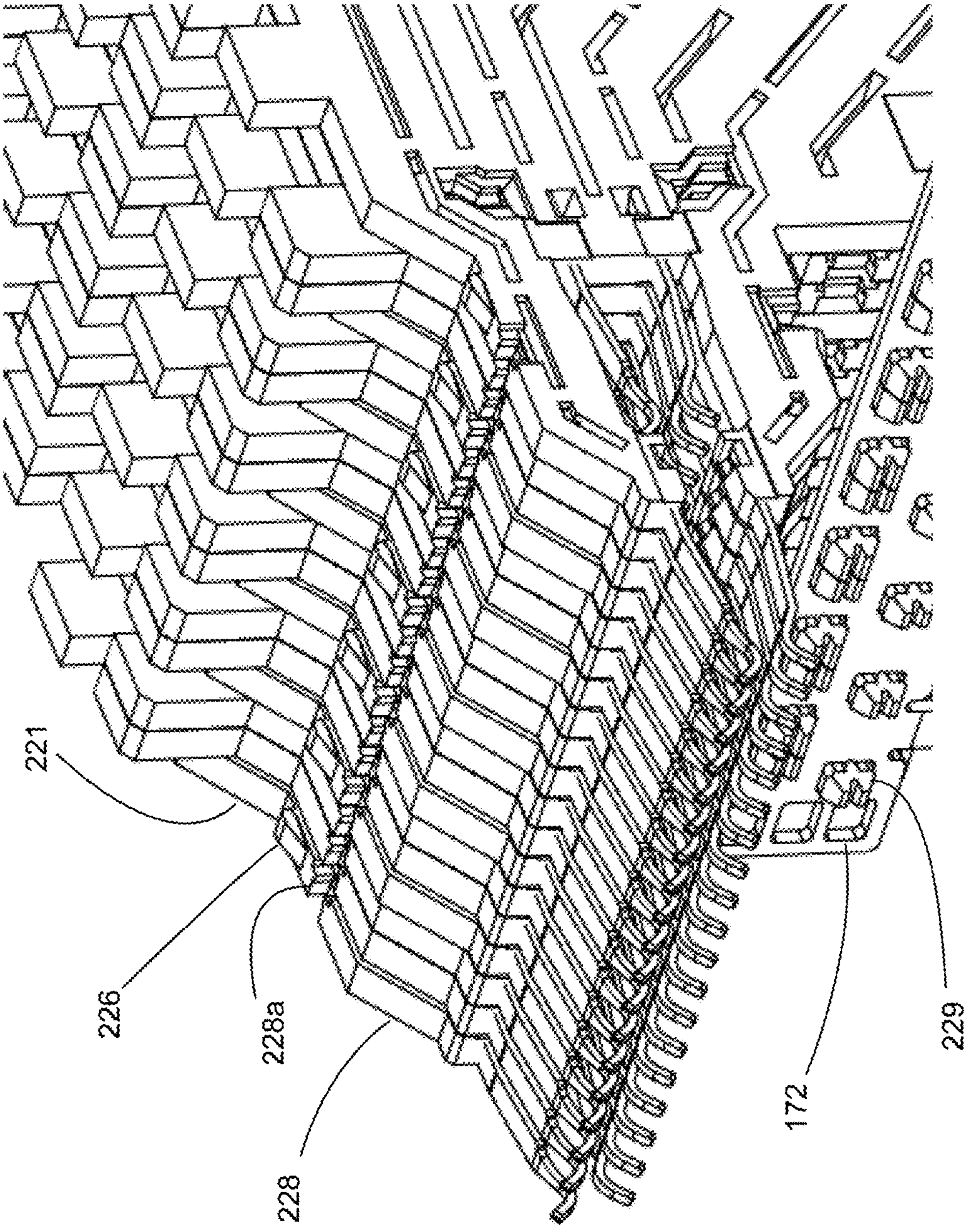
FIG. 15 illustrates a perspective view of the embodiment depicted in FIG. 13 with the card slot plug removed.
Figure 16:
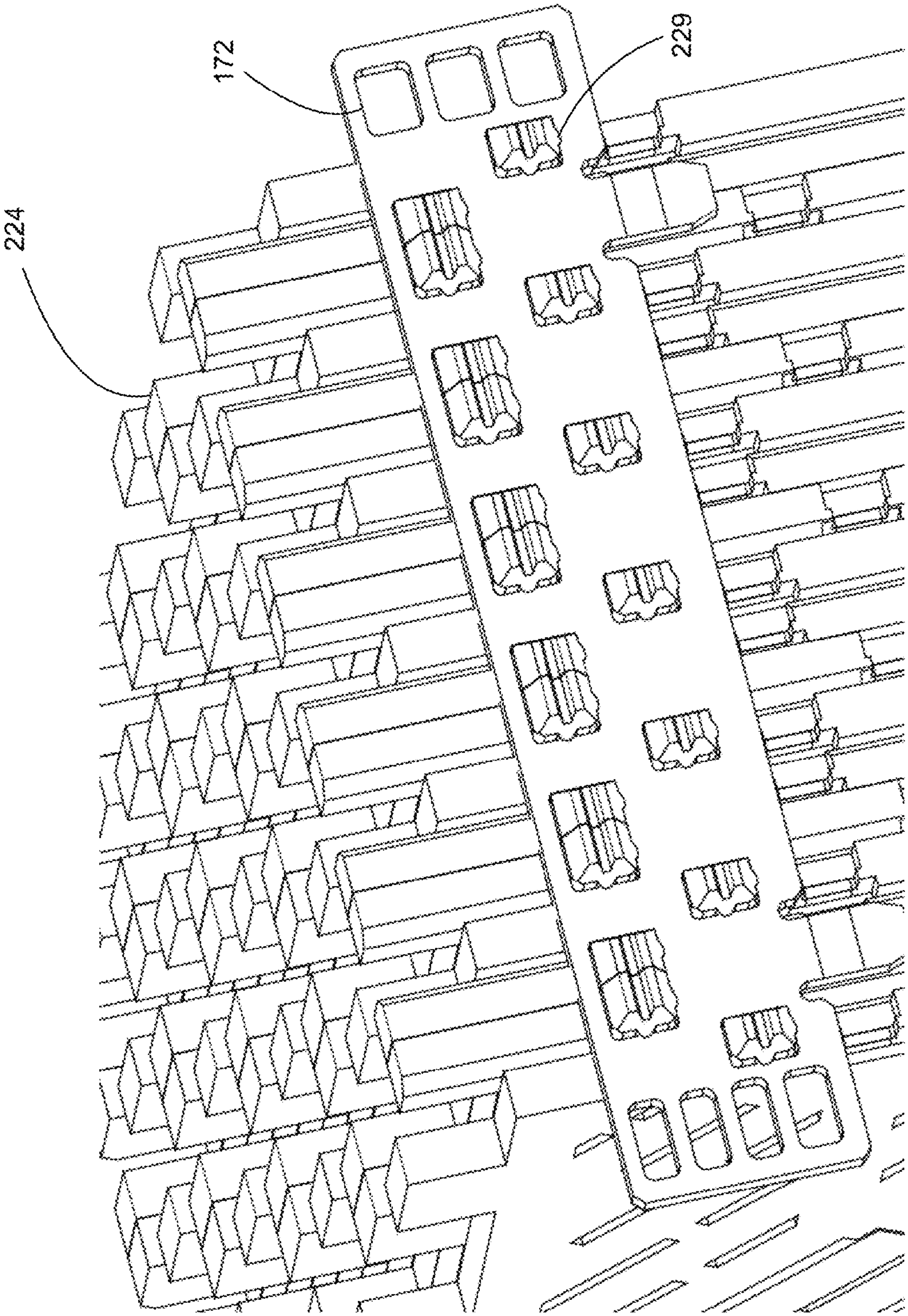
FIG. 16 illustrates a perspective view of an embodiment of a retaining bar securing a wafer set.
Figure 17:
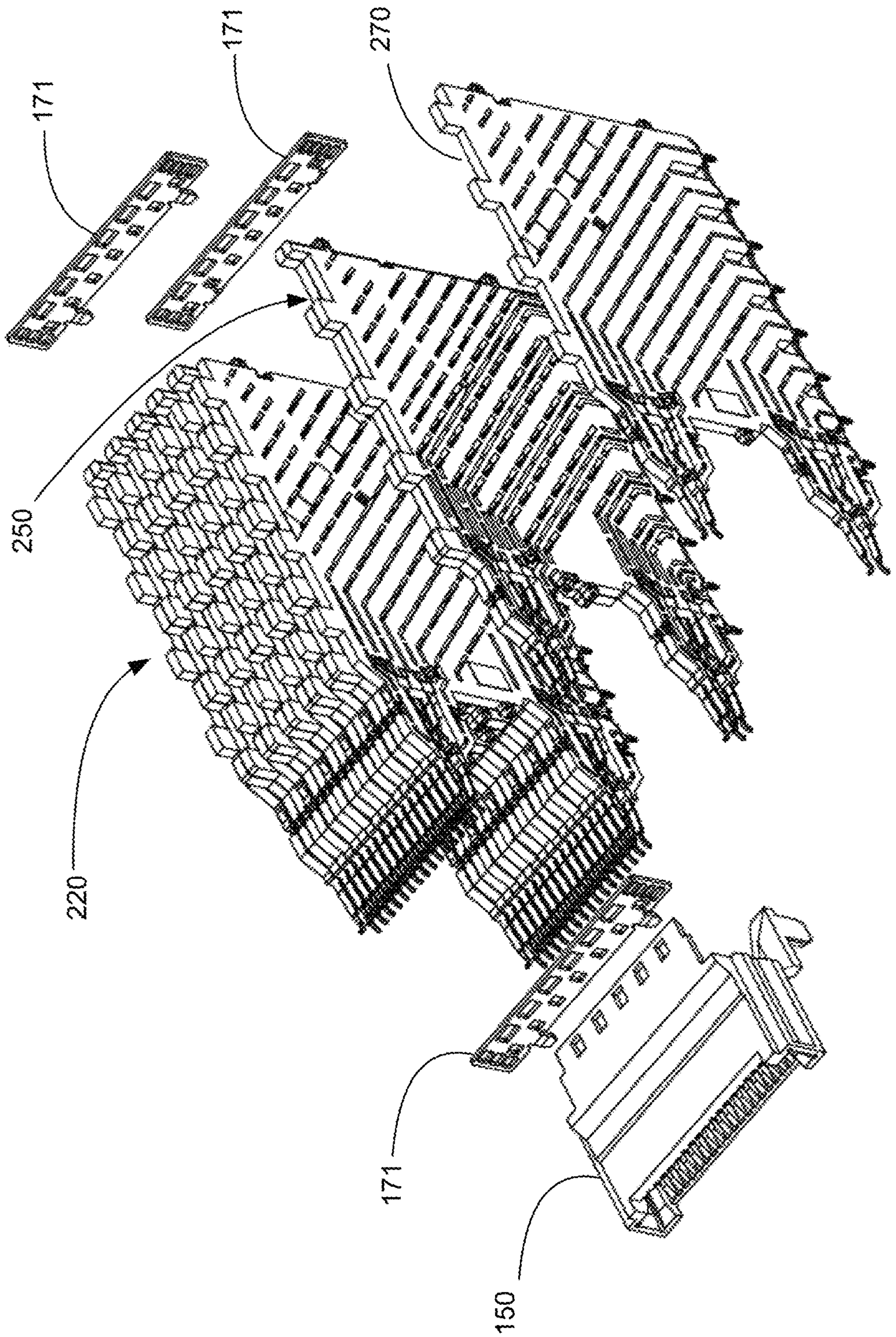
FIG. 17 illustrates an exploded partial perspective view of an embodiment of a connector.
Figure 18:
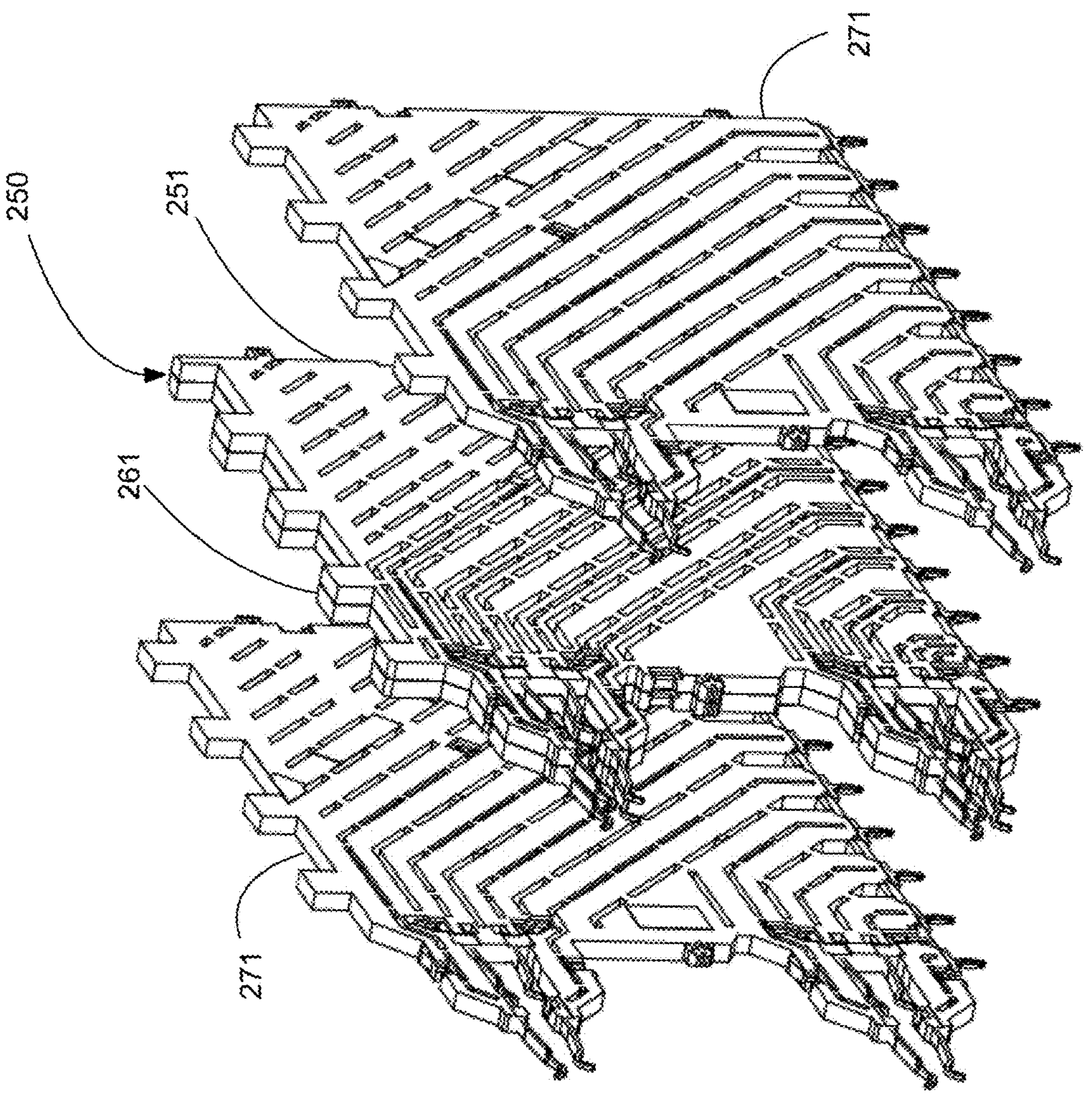
FIG. 18 illustrates a partially exploded perspective view of an embodiment of a signal wafer pair surrounded by ground wafers.
Figure 19:
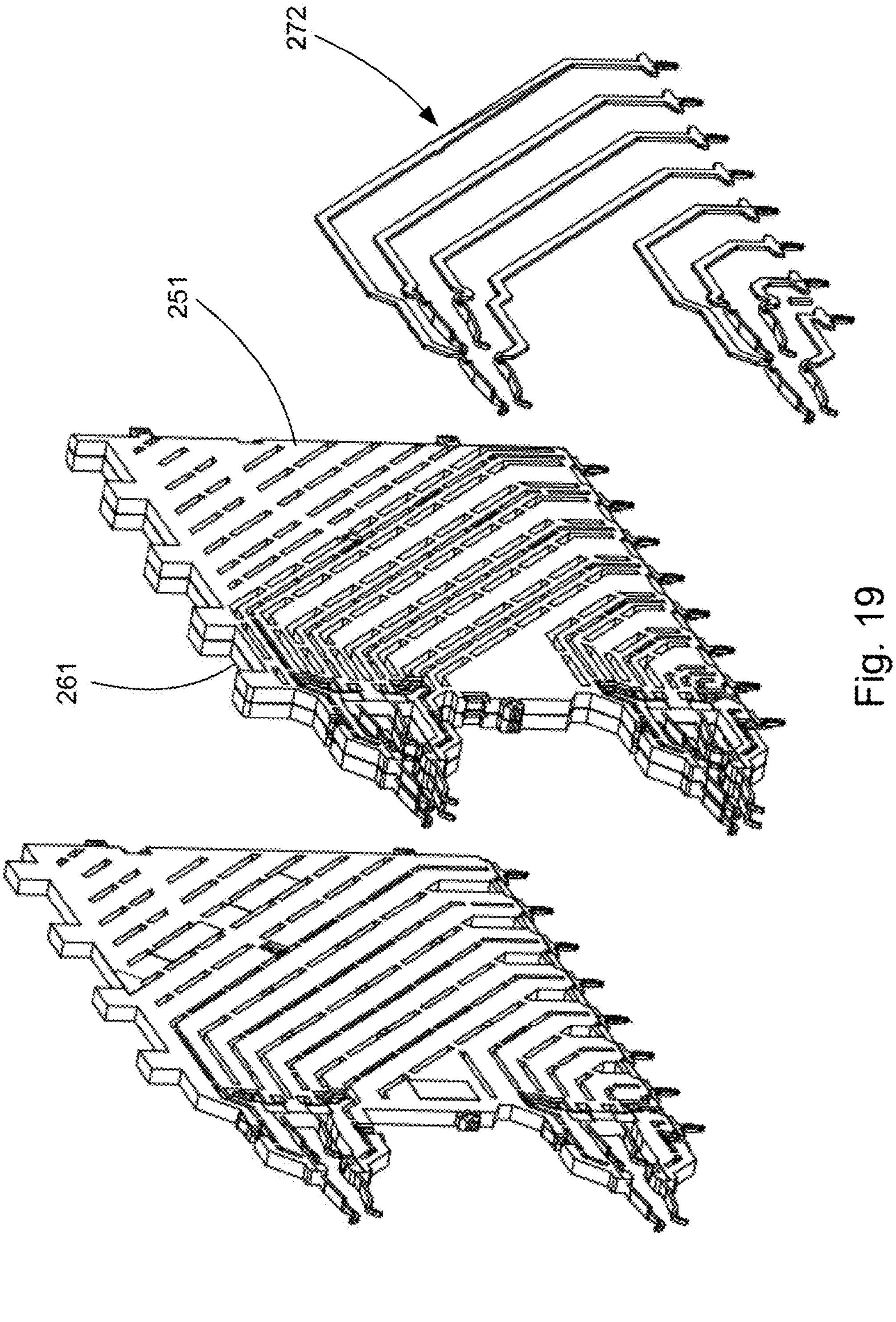
FIG. 19 illustrates a simplified perspective view of the embodiment depicted in FIG. 18 with an insulative frame removed for illustrative purposes.
Figure 20:
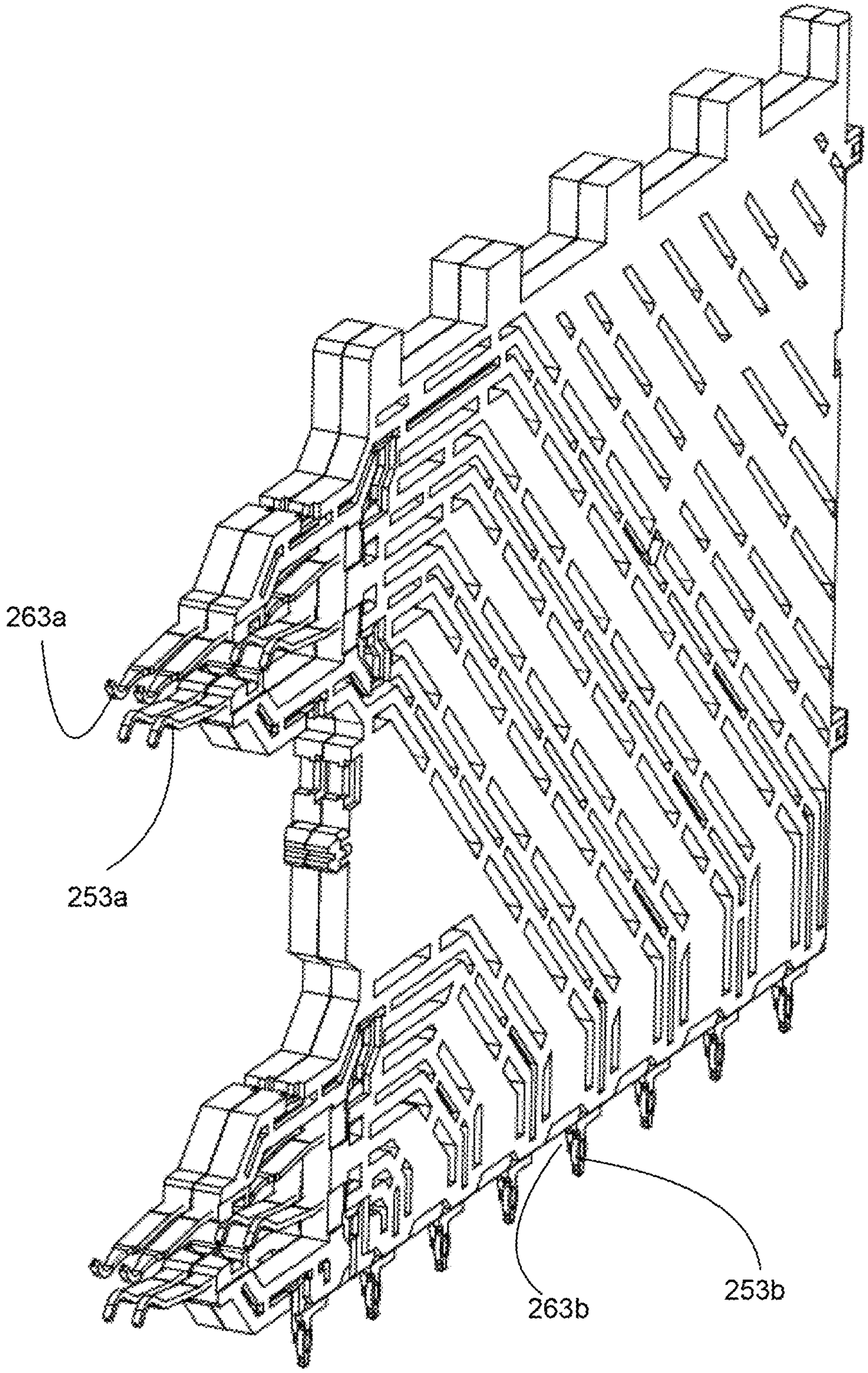
FIG. 20 illustrates a perspective view of an embodiment of a signal wafer pair.
Figure 21:
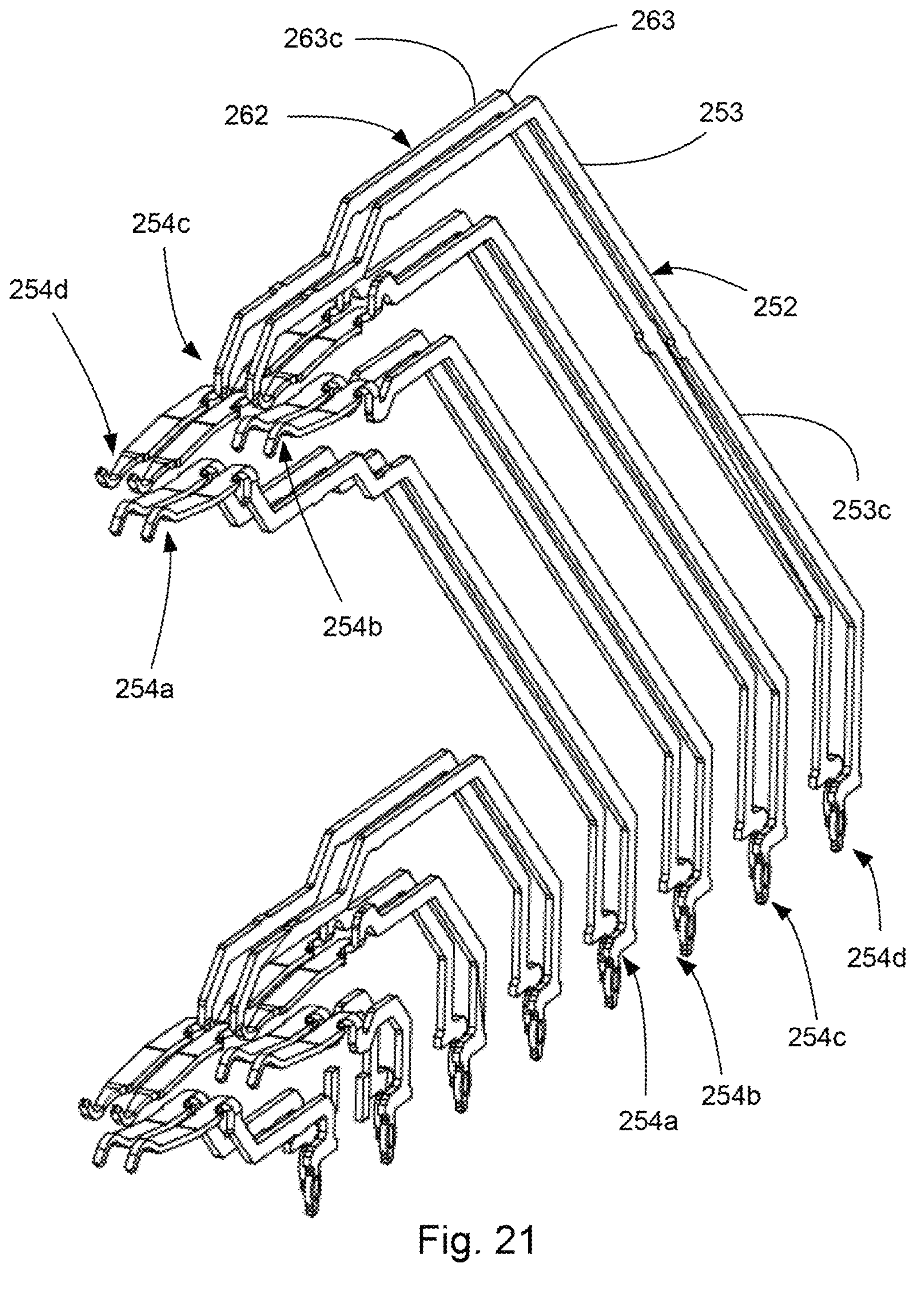
FIG. 21 illustrates a perspective view of the embodiment with the insulative frame removed.
Figure 22:
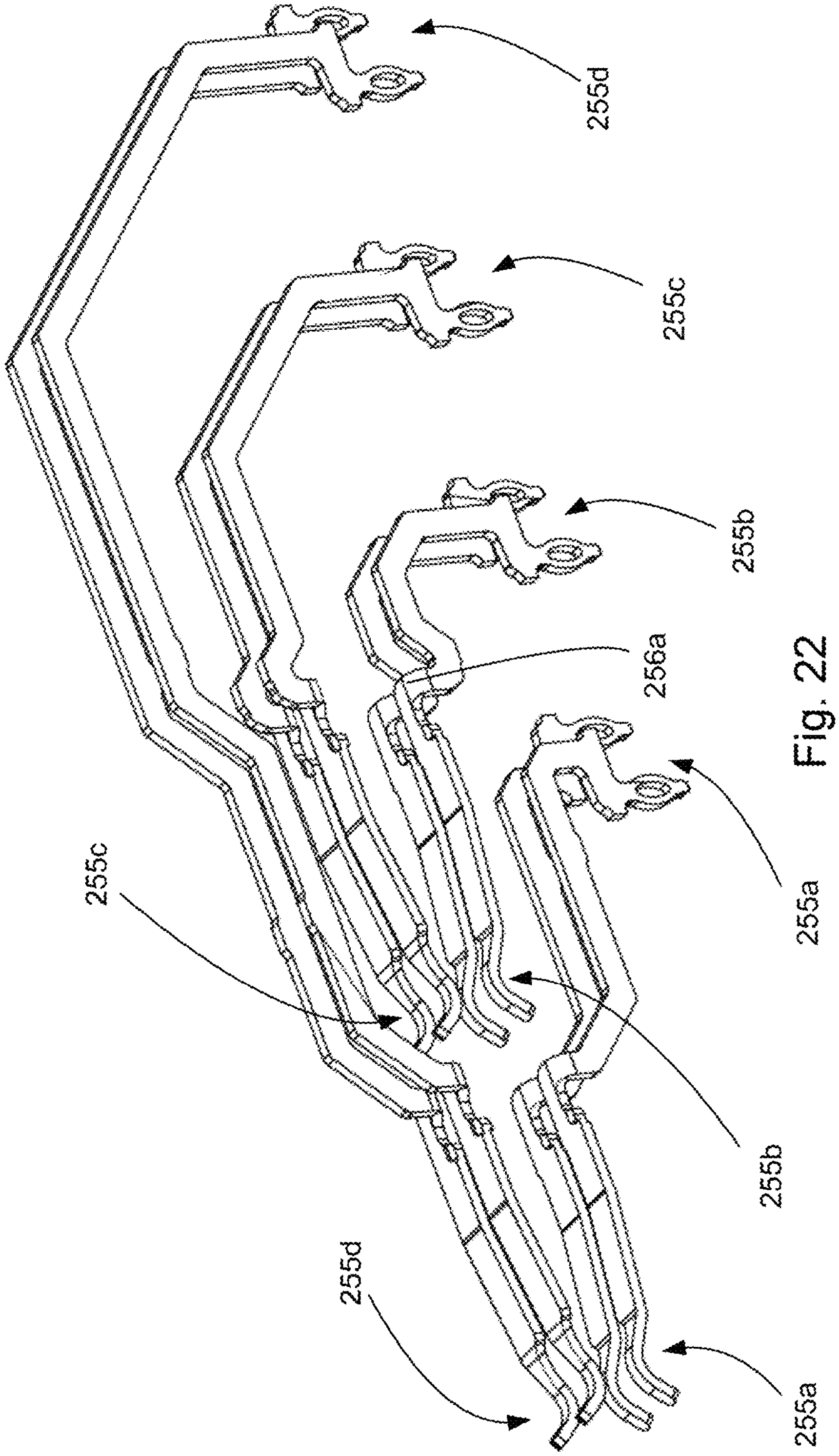
FIG. 22 illustrates a perspective view of an embodiment of terminals that provide the contact rows in the bottom port.
Figure 23:
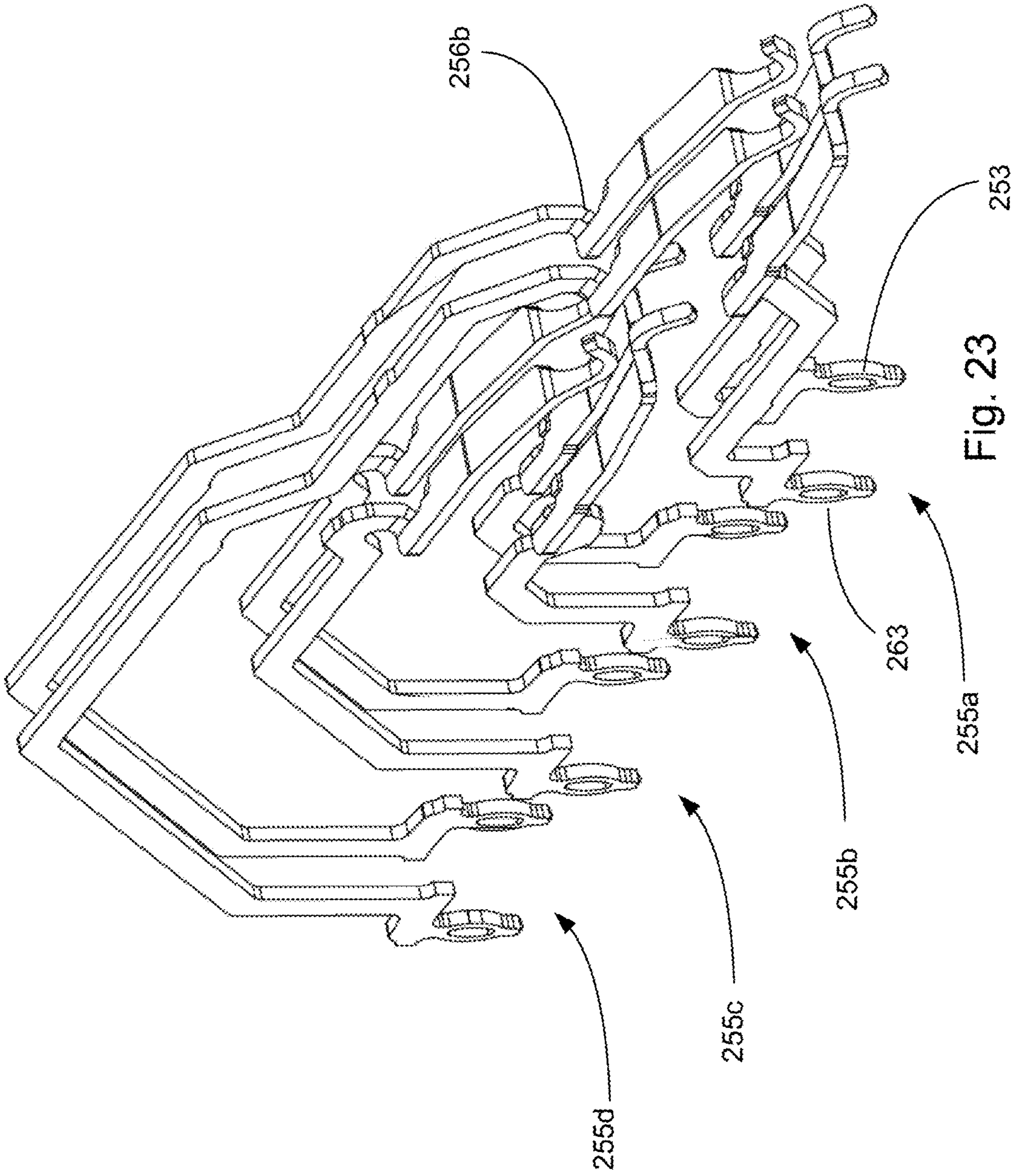
FIG. 23 illustrates another perspective view of the embodiment depicted in FIG. 22.
Figure 24:
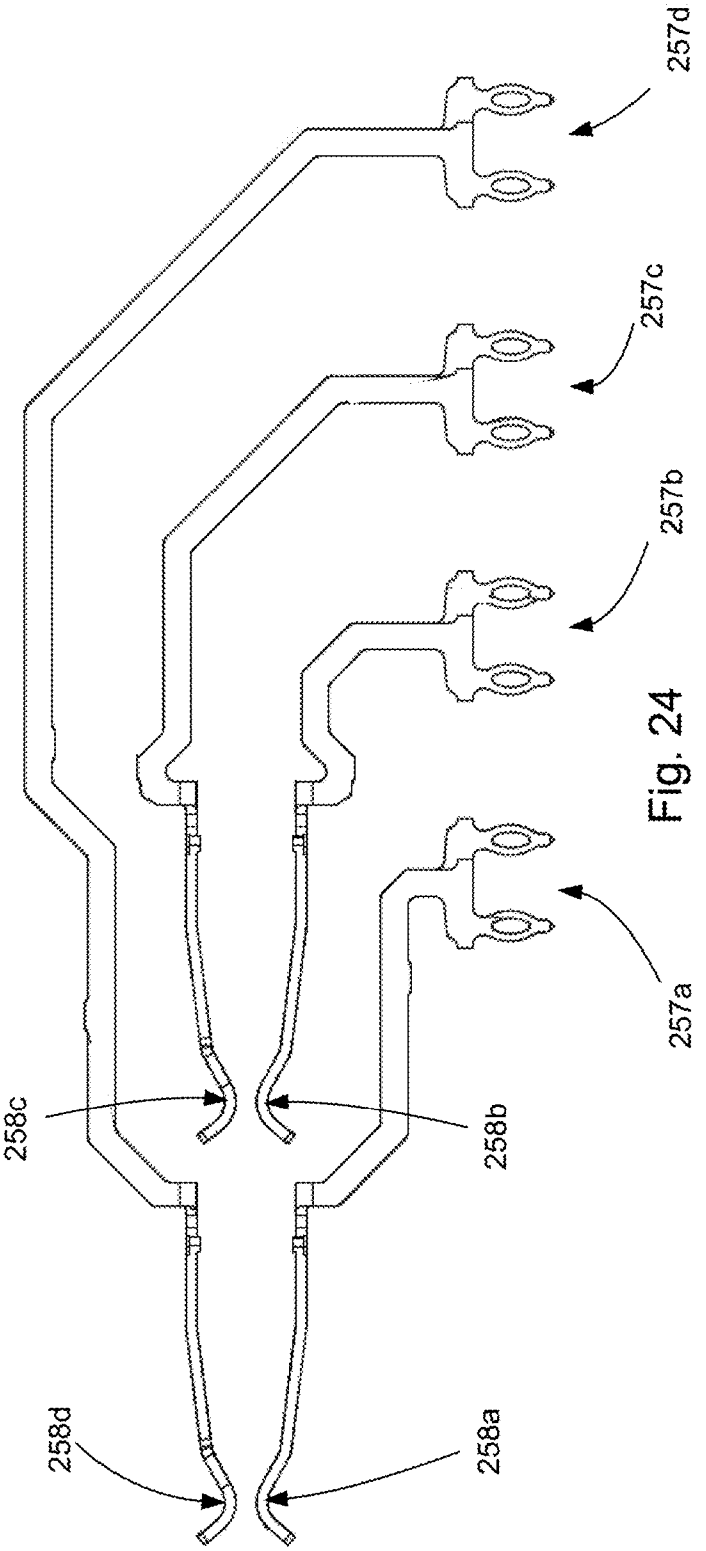
FIG. 24 illustrates an elevated side view of the embodiment depicted in FIG. 22.
Figure 25A:
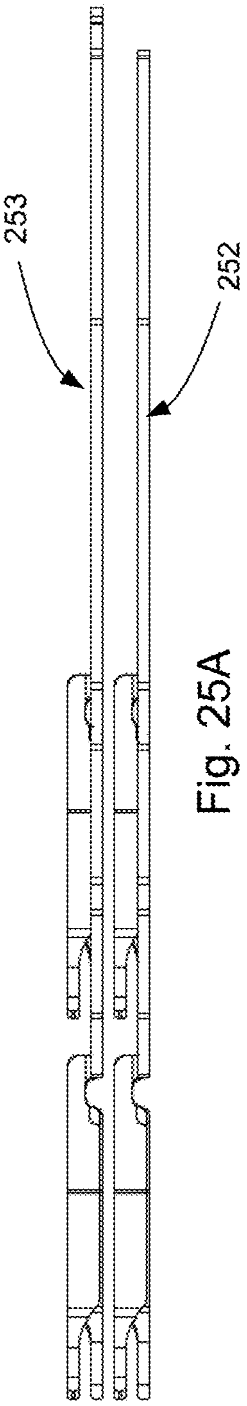
FIG. 25A illustrates a plan view of the embodiment depicted in FIG. 21.
Figure 25B:
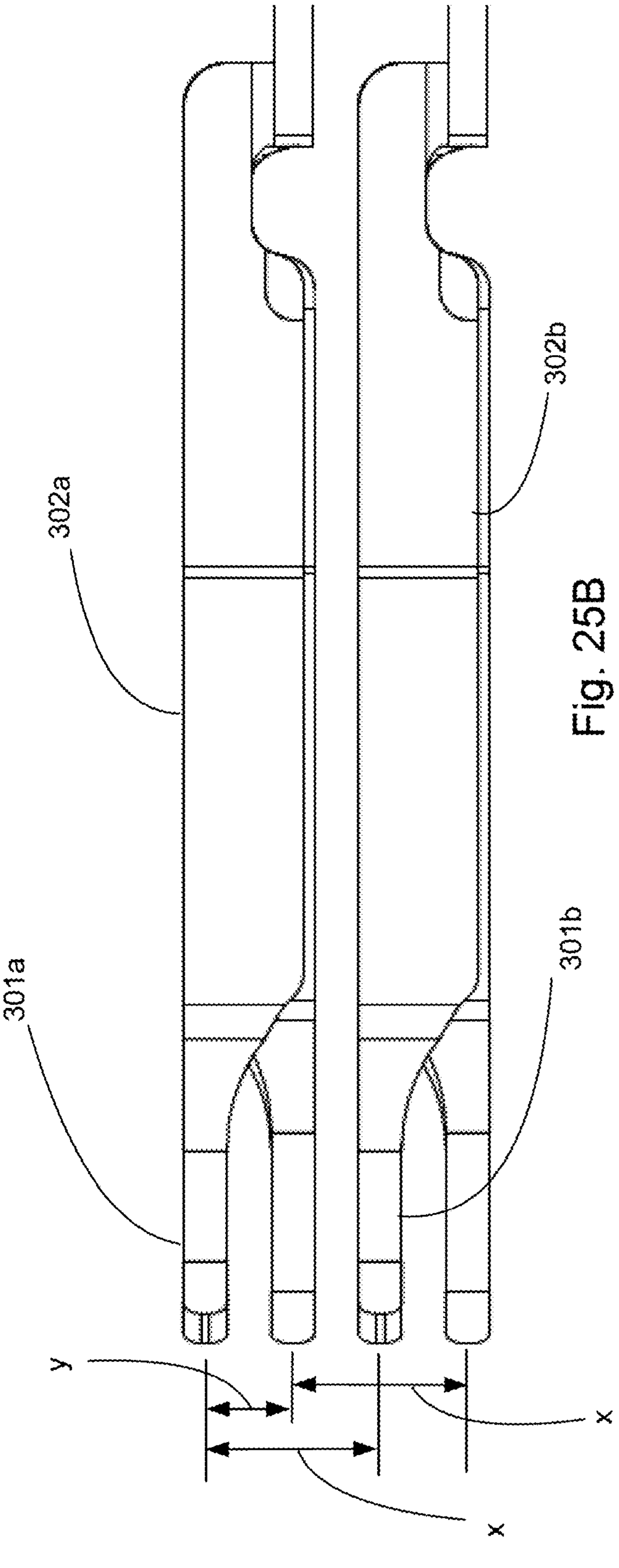
FIG. 25B illustrates an enlarged plan view of the embodiment depicted in FIG. 25A.

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

As can be appreciated from FIGS. 1-5, a receptacle 100 is mounted on a circuit board and provides a right-angled construction that is configured to receive plug module 20. The depicted receptacle 100 design is beneficial to use with plug modules that include cooling slots 115. While the use of cooling slots 115 in a module is not required the cooling slots 115 can provide additional cooling and make it easier, when used with other features disclosed herein, to cool a module that uses 8 or more watts of power.

The receptacle 100 includes a cage 120 and can support light pipes 105 if desired. The cage includes a top wall 122, a first side wall 123, a second side wall 124, a rear wall 124 and a front edge 126. The receptacle 100 defines a top port 121*a* and a bottom port 121*b*. The first and second side walls 123, 124 can include vent apertures 135.

As can be appreciated, the depicted designs are intended to facilitate cooling of an inserted plug module 20. Thus, the design has been tailored to improve air flow in a number of ways that will be discussed herein. In certain embodiments the receptacle 100 can include an internal riding heat sink 134 that is in communication with a front grill 130 and a rear aperture set 132. The top wall 122 can include a cooling aperture 122*a* and an external riding heat sink 133 can be positioned therein. Riding heat sinks are typically designed so that the extend into the port and engage an inserted plug module, helping to provide a conductive path to direct heat away from the plug module. It should be noted that in certain circumstances it may not be desirable to have the additional cooling (for example, in applications where there is no intention to use active modules) and in such situations many of the optional thermal features can be omitted. Thus, the depicted internal riding heat sink and the various venting features can be omitted if not desired.

One common design of existing receptacles is the use of a housing positioned inside of a cage, the housing helping to define a connector. The cage helps support the mating plug module, can help support the connector and can also provide EMI protection. The connector positioned in the cage supports terminals that include tails and contacts that allow the mating plug module to be electrically connected to a circuit board (or to cables if a Bipass design is desired). The receptacle, which is typically press-fit onto a circuit board to ease assembly, thus must have the terminals of the connector aligned with terminals on the cage. As can be appreciated, the cage can be formed of metal and is expected to have a fairly repeatable arrangement of tails that have the desired dimensional control with respect to each other. The tails of the connector can also be carefully manufactured so that they are aligned with each other. It is somewhat more difficult, however, to align the tails of the connector with the tails of the cage as there are multiple points of dimensional stack-up. This dimensional issues is made more difficult by the fact that in a typical press fit design the housing supports wafers that support the terminals. Thus, the terminals are dimensional controlled with respect to each other within a wafer but have dimensional stack-up with respect to both the housing and other wafers while the housing has dimensional stack-up with the cage. Prior designs attempted to have a datum that acts as a stop to carefully control insertion of the housing into the cage to control the tolerances between the datum point and the tails of both the cage and the connector.

While such control is possible, it turns out to be more challenging and difficult, particularly as the tails are reduced in size. Applicants have determined that instead of having a stop that limits and controls the position of the housing with respect to the cage it is more desirable to have a system where the cage 120 and connector 129 are mated together in a manner that allows for infinite adjustment over a small range so that mating of the cage 120 and the connector 129 can be done in a controlled manner and dimensional control can be assured. As depicted, the cage 120 includes bottom walls 140, 141 that each have a tongue 142 that is inserted into the respective card slot plug 150, 160. More specifically, the tongues 142 from the cage 120 are inserted into tongue slots 153, 163 in mating portions 152, 162, respectively, of card slot plugs 150, 160. As can be appreciated, the card slot plugs 150, 160 engage a wafer set 220 and would provide some additional dimensional stack up therebetween. In an embodiment, the insertion can be done based on alignment between the wafer set 220 and the cage 120, thus eliminating some of the dimensional stack up that would otherwise exist. In an embodiment the tongues 142 have an interference fit with the tongue slots 153, 163 so that the cage and connector 129 are appropriately joined and stay at the appropriate location relative to each other. Such a manufacturing process allows a position of the cage 120 and the wafer set 220 to be better controlled with respect to each other and improves the yield of receptacles 100 while ensuring the receptacle 100 can properly be mounted on a circuit board.

As can be appreciated from the Figures, the depicted connector 129 omits a housing. Applicants have surprisingly discovered that the use of a housing is unnecessary to support a wafer set 220 so long as the wafers are securely fastened together, preferably on at least two sides. In a depicted embodiment retaining bars 171 are positioned on opposing sides and one of the sides has two retaining bars 171. The retaining bars 171 are connected to wafers 221 via wafer nubs 229 that can be heat staked onto the retaining bars 171. The depicted connector 129 illustrates an embodiment where a triangular arrangement is provided with two retaining bars 171 positioned on one side and one retaining bar 171 positioned on a second side of the wafer set. While it is desirable to have at least two retaining bars 171 (each positioned on a different side of the connector) a triangular arrangement of retaining bars 171 has been determined to be beneficial as it provides improved control and support for wafers 221 that make up the wafer set 220. It has been determined that removing the housing provides certain unexpected benefits. One issue is that no housing is perfectly square and straight, thus the tolerance in the housing adds to the tolerance in the wafers and thus increases the tolerance of the location of the tails. By removing the housing Applicants can better control the position of the tails of the wafer set with respect to the cage. The removal of the housing also allows for the size of the receptacle to be decreased, thus allowing for increased density.

Each wafer 221 includes an insulative frame 221*a*. The depicted insulative frames 221*a* includes top projections 224 and supports terminal sets 252, 262, 272 (as is expected in embodiments where there is a three wafer system that includes a ground wafer and two signal wafers). It should be noted that the configuration of the depicted terminals, while beneficial for the depicted receptacle, is not intended to be limiting as the features of providing a connector without a housing has broad applicability. Thus the design elements that provide for the removal of the housing could be used with a wide range of wafer configurations.

The terminal set 252 includes terminals 253 that each include a contact 253*a*, a tail 253*b* and a body 253*c* that extends therebetween. Similarly, the terminal set 262 includes terminals 263 that include a contact 263*a*, a tail 263*b* and a body 263*c* that extends therebetween. As the depicted tails 253*b*, 263*b* are intended to press-fit into a circuit board it is helpful to provide a receptacle where force can be readily applied to the tails to press them into vias on a circuit board. As depicted, the insulative frame 121*a* includes top projections that extend to a top wall 122 of the cage 120. As a result of the depicted design, a force exerted on the cage 120 is transferred through the insulative frame 121*a* to the tails 253*b*, 263*b* and thus a reliable press-fit operation is possible.

The depicted top projections 124 have a number of cutouts 124*a* so that the wafer engages the top wall in several places but also leaves gaps. The cutouts 124*a* can be arranged in a pattern that allows air to flow along the top wall 122 of the cage in a desirable manner. As can be appreciated, the number and size of the cutouts 124*a*, as well as the location, can vary as appropriate to provide the desired air flow.

Figure 26:
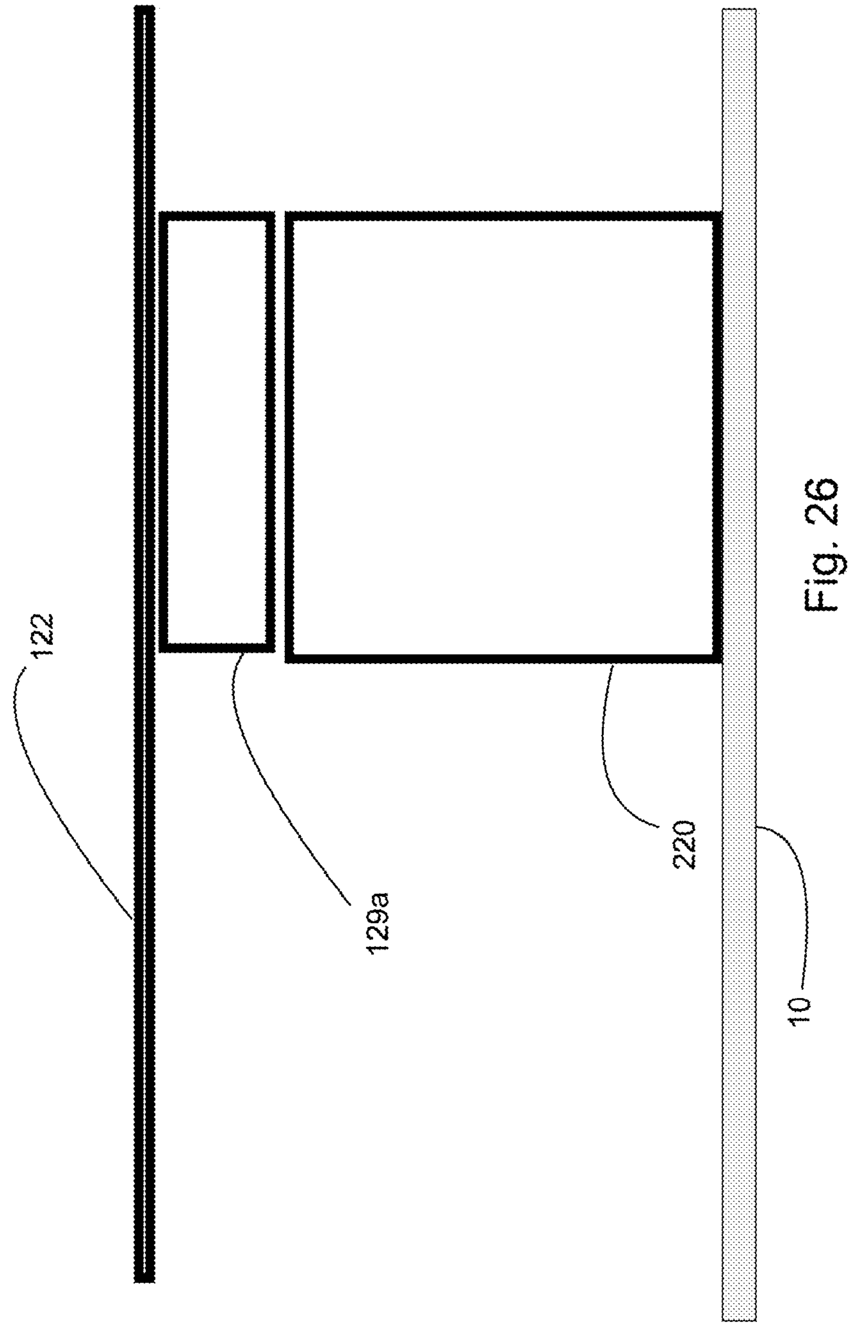
FIG. 26 illustrates a schematic depiction of an embodiment of a connector with an insert.

It should be noted that the cutouts 124*a*, while providing a tortuous path for air to flow through, do not provide a straight path for the air to flow between the wafers and the top wall and thus may increase the pressure drop of air flow through the receptacle. While the depicted path could be considered a zig-zag or undulating path, other paths could also be provided, depending on the configuration of the top wall. In an alternative embodiment the projection 124 can be shortened and an insert 129*a* (shown in schematic representation in FIG. 26) can positioned between the wafer set 220 and the top wall 122. The insert 129*a* can transfer force from the top wall 122 to the wafers 221 while providing a more optimized air flow path between the top wall 122 and the wafer set 220 (thus reducing air resistance). In another alternative embodiment the insert 129*a* can be removeable and just used to mount the connector on the circuit board 10 before being removed. In such a design the back wall 125 of the cage 120 can be attached after the cage 120 (or at least most of it) and connector 129 are both pressed into the circuit board and the opening can provide reduced air resistance. Thus a number of variations are possible, depending on the need for air flow and the desire to manage costs.

The depicted design provides wafers 221 that have a front contact row 245 and a rear contact row 246 that are spaced apart in a plug module insertion direction and the contact rows are configured to engage two rows of pads on a mating connector. While not required, the benefit of such a design is a substantial increase in density. If such density is not desired then the wafers can be made to support a lesser number of terminals. It should be noted that depicted wafers are arranged in pattern that provides a ground, signal, signal pattern that can be repeated. Other patterns are also possible if desired. If desired, the ground wafers could include terminals that are commoned together and in an embodiment the ground wafers could have contacts that engage the top wall to provide electrical grounding to the cage.

Because the connector 129 does not need a housing (although it is possible to use a housing if desired in certain embodiments), the depicted connector 129 supports card slots plugs with the wafer set 220. As depicted, the card slots plugs 150, 160 each have shoulders that are similar to the shoulders 156*a*, 156*b* that latch onto retaining features on at least some of the wafers in the wafer set 220 to provide desirable location and stability control. In an embodiment just the ground wafers can include retention features. As depicted, the shoulders 156*a*, 156*b* can have grooves 154 that engage projections 226 but other retention configurations would also be suitable. The card slot plugs 150, 160 are positioned in ports 121*a*, 121*b* defined by the cage 120 and provide card slots 151 that have contacts positioned on both sides of the card slots 151. The card slots 151 preferably include terminal grooves 155 for the front contact row 245 so that the most vulnerable contacts are protected during the initial mating with a mating plug connector. As the front portion of the card slot plugs 150, 160 helps align and control the mating paddle card, the rear contact row 246 can beneficially omit the terminal slots. If desired a card slot plug 160 can include a peg 166 that is intended to be inserted into a circuit board but such a feature is optional and is not expected to be as helpful for a design that includes two vertically arranged ports in a 2×N configuration.

In an embodiment the retaining bar 171 can be configured to engage the cage 120. The retaining bar 171 can be made wider than the wafer set 220 so that the retaining bar 171 slides along the side walls of the cage 220. If such a construction (which helps ensure proper alignment of the cage 120 to the wafer set 220) is desired then the retaining bar 171 can include vent apertures 172 to allow air to flow more readily through the receptacle.

It has been determined that for a full double row design it is desirable that the contacts all be blanked and formed (it has been determined that this provides mechanical and signal integrity benefits). Thus the depicted embodiment features two rows of stamped and formed contacts on both sides 151*a*, 151*b* of the card slot 151.

To support the front contact row 245, the wafers 221 include an arm 228 that extends past the rear contact row 246. The arm 228 helps ensure the impedance is more consistently managed through the body of the wafer. To provide for suitable flexibility the arm 228 can include a notch 228*a* that allows that arm 228 to flex slightly.

As noted above, each of the terminals includes the contact, tail and body extending therebetween. The depicted configuration includes a ground wafer 271 and a signal wafer set 250 that includes a first signal wafer 251 and a second signal wafer 261. The signal wafer set 250 thus provides for the top port a first different pair 254*a*, a second differential pair 254*b*, a third differential pair 254*c* and a fourth differential pair 254*d*. The signal wafer set 250 also provides for the bottom port a fifth differential pair 255*a*, a sixth differential pair 255*b*, a seventh differential pair 255*c* and an eighth differential pair 255*d*. From the depicted terminal configuration it can be appreciated that for both the top and bottom ports the terminals that form the two back differential pairs have tails that are positioned between tails of the two differential pairs that form the front contacts. For example, differential tail sets 257*b* and 257*c* are associated with contact pairs 258*b* and 258*c*, respectively and the contact pairs 258*b*, 258*c* are in the rear contact row. Differential tail sets 257*a* and 257*d* are on both sides of the differential tail sets 257*b*, 257*c* and are associated with contact pairs 258*a*, 258*d* that are in the front contact row. It has been determined that this configuration is beneficial as it allows for the three rows of terminals to have similar lengths while having one significantly longer terminal. Thus the depicted embodiment helps provide more consistent terminal lengths.

As can be appreciated, a top row of contacts opposes a bottom row of contacts. In an embodiment the contacts of the terminals that form that the top row of contact can have a form 256*b* that is folded in a first direction and the terminals that form the bottom row of contacts can have a form 256*a* that is also folded in the first direction. For example, when looking straight at the contacts in a plug module insertion direction all the sets of contacts can have forms that are folded to one side (e.g., they can all be folded to the left or to the right). While such a construction is beneficial, it turns out that for certain applications it is desirable to have the top row of contacts offset from the bottom row of contacts. To provide this functionality the contact can taper down from a beam portion 302*a*, 302*b* to a pad touching portion 301*a*, 301*b*, where the pad touching portion 301*a*, 301*b* is less than half the width of the beam portion 302*a*, 302*b*. If desired, the pad touching portion of the top row can be on opposite sides of the beam portion as the pad touching portions on the bottom row so as to provide an offset alignment. If such an alignment is not needed then the contacts can be configured symmetrically or in some other desired configuration.

The pitch can vary depending on the intended interface. As depicted the terminals are on a x pitch, which could be 0.8 mm and the top and bottom terminals can have a y offset, which can be 0.4 mm. If the connector provides a double row of contacts on the top and bottom and the front contacts are intended to be compatible with existing designs then it will be beneficial to have the pitch of the contacts match existing designs. If a clean sheet design is preferred then the pitch can be varied as desired, keeping in mind that signal integrity performance can be more challenging as the pitch decreases below 0.8 mm and that a pitch below 0.65 typically requires additional features such as biased paddle cards and/or contact interface (such as is used in the OCU-LINK connector).

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

The invention claimed is:

1. A connector assembly, comprising:

a cage defining a port and forming a bottom wall having a protruding tongue at a connective side of the bottom wall; and a card slot plug forming a mating portion having a tongue slot configured to receive the protruding tongue at the connective side of the bottom wall, wherein the protruding tongue provides an interference fit with the tongue slot when the protruding tongue is inserted into the tongue slot of the mating portion.

2. The connector assembly of claim 1, wherein the card slot plug engages a connector having a wafer set.

3. The connector assembly of claim 2, wherein the wafer set is positioned in the cage, wherein the wafer set includes a plurality of wafers, wherein the wafer set is not being supported by a housing that extends along a substantial portion of the wafer set, wherein the wafer set has a first side, a second side, and a third side, wherein each wafer of the plurality of wafers in the wafer set has an insulative frame that supports a plurality of terminals, wherein at least one terminal from the wafer set has a folded form, wherein the folded form orients a contact end of the at least one terminal to face a top wall of the cage, and wherein at least some of the plurality of wafers in the wafer set are arranged in a wafer pattern comprising a ground wafer, a signal wafer, and another signal wafer.

4. The connector assembly of claim 3, wherein at least one wafer among the plurality of wafers has at least one cutout in the insulative frame, the at least one cutout being adjacent to the top wall so as to provide a tortuous air path along the top wall and through the at least one cutout.

5. The connector assembly of claim 2, wherein the wafer set provides dimensional stack up between the card slot plug and the cage.

6. The connector assembly of claim 2, wherein insertion of a plug module into the connector assembly is based on alignment between the wafer set and the cage to reduce dimensional stack up between the card slot plug and the cage.

7. The connector assembly of claim 1, wherein the tongue slot is a size larger than the protruding tongue to provide an infinite adjustment over a range defined by a difference in a size of the tongue slot to a size of the protruding tongue.

8. A receptacle, comprising:

a cage defining a port and forming a top wall, two side walls, a rear wall, and a bottom wall, the bottom wall having a protruding tongue at a connective side of the bottom wall;

a wafer set positioned in the cage, the wafer set including a plurality of wafers, the wafer set not being supported by a housing that extends along a substantial portion of the wafer set, the wafer set having a first side, a second side, and a third side, each wafer of the plurality of wafers in the wafer set having an insulative frame that supports a plurality of terminals, at least one terminal from the wafer set having a folded form, the folded form orienting a contact end of the at least one terminal to face the top wall, wherein at least some of the plurality of wafers in the wafer set are arranged in a wafer pattern comprising a ground wafer, a signal wafer, and another signal wafer;

a first retaining bar positioned on the first side and a second retaining bar positioned on the second side; and a card slot plug forming a mating portion having a tongue slot configured to receive the protruding tongue at the connective side of the bottom wall, wherein the protruding tongue is inserted into the tongue slot of the mating portion.

9. The receptacle of claim 8, wherein the card slot plug engages a connector having the wafer set.

10. The receptacle of claim 8, wherein at least one wafer among the plurality of wafers has at least one cutout in the insulative frame, the at least one cutout being adjacent to the top wall so as to provide a tortuous air path along the top wall and through the at least one cutout.

11. The receptacle of claim 8, wherein the wafer set provides dimensional stack up between the card slot plug and the cage.

12. The receptacle of claim 8, wherein insertion of a plug module into the receptacle is based on alignment between the wafer set and the cage to reduce dimensional stack up between the card slot plug and the cage.

13. The receptacle of claim 9, wherein the protruding tongue provides an interference fit with the tongue slot to join the cage and the connector.

14. The receptacle of claim 8, wherein the tongue slot is a size larger than the protruding tongue to provide an infinite adjustment over a range defined by a difference in a size of the tongue slot to a size of the protruding tongue.

* * * * *